US012587630B2

(12) United States Patent
Park et al.

(10) Patent No.: US 12,587,630 B2
(45) Date of Patent: Mar. 24, 2026

(54) ELECTRONIC DEVICE FOR DISPLAYING 3D IMAGE AND OPERATION METHOD THEREOF

(71) Applicant: Samsung Electronics Co., Ltd., Suwon-si (KR)

(72) Inventors: Jaesung Park, Suwon-si (KR); Youngsu Moon, Suwon-si (KR); Junghwa Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 19/072,291

(22) Filed: Mar. 6, 2025

(65) Prior Publication Data
US 2025/0203062 A1      Jun. 19, 2025

Related U.S. Application Data

(63) Continuation of application No. PCT/KR2023/014831, filed on Sep. 26, 2023.

(30) Foreign Application Priority Data

Sep. 29, 2022   (KR) ......................... 10-2022-0124662
Jan. 27, 2023   (KR) ......................... 10-2023-0011114

(51) Int. Cl.
*G09G 5/00*        (2006.01)
*H04N 13/302*      (2018.01)
*H04N 13/366*      (2018.01)

(52) U.S. Cl.
CPC ......... *H04N 13/366* (2018.05); *H04N 13/302* (2018.05)

(58) Field of Classification Search
CPC ... G06N 3/00; G06N 3/08; G06T 3/40; H04N 13/302; H04N 13/366
See application file for complete search history.

(56) References Cited

U.S. PATENT DOCUMENTS 10,271,041 B2    4/2019   Hwang et al.
11,138,793 B2    10/2021  Samec et al.
          (Continued)

FOREIGN PATENT DOCUMENTS

KR      20120069372 A      6/2012
KR      20170017586 A      2/2017
          (Continued)

OTHER PUBLICATIONS

International Search Report and Written Opinion of the ISA for PCT/KR2023/014831 mailed Dec. 27, 2023, 13 pages.

*Primary Examiner* — Insa Sadio
(74) *Attorney, Agent, or Firm* — Nixon & Vanderhye P.C.

(57)        ABSTRACT

An electronic device may include a base panel, an optical layer, a front panel, a user tracking sensor configured to obtain a viewing angle of a user, a memory, and a processor(s) configured to execute at least one instruction stored in the memory, wherein the processor(s) may be configured to obtain an input image including a plurality of view images, generate a base image by decomposing the input image by using a base image generation model, generate a front image corresponding to a viewing angle of the user by decomposing the input image by using a front image generation model, based on view characteristic information of the base panel which corresponds to the viewing angle of the user, view characteristic information of the front panel which corresponds to the viewing angle of the user, and characteristic information of the optical layer, and provide the image to the user by displaying the base image on the base panel and displaying the front image on the front panel.

20 Claims, 15 Drawing Sheets

(56)          References Cited

U.S. PATENT DOCUMENTS

| | | | |
|---|---|---|---|
| 11,204,540 | B2 | 12/2021 | Popovich et al. |
| 11,244,485 | B2 | 2/2022 | Harrises et al. |
| 11,393,158 | B2 | 7/2022 | He et al. |
| 11,415,935 | B2 | 8/2022 | Hornstein et al. |
| 11,425,363 | B2 | 8/2022 | Appelgate et al. |
| 11,804,155 | B2 | 10/2023 | Lim et al. |
| 11,948,485 | B2 | 4/2024 | Jin et al. |
| 2004/0223218 | A1 | 11/2004 | Putilin et al. |
| 2005/0122549 | A1* | 6/2005 | Goulanian .......... G03H 1/0808 |
| | | | 359/3 |
| 2015/0297949 | A1* | 10/2015 | Aman .................... G06T 7/246 |
| | | | 348/157 |
| 2022/0210397 | A1 | 6/2022 | Kim et al. |

FOREIGN PATENT DOCUMENTS

| | | | |
|---|---|---|---|
| KR | 20220067950 | A | 5/2022 |
| KR | 20220092247 | A | 7/2022 |
| KR | 20220093975 | A | 7/2022 |
| KR | 20220126598 | A | 9/2022 |

* cited by examiner

FIG. 11

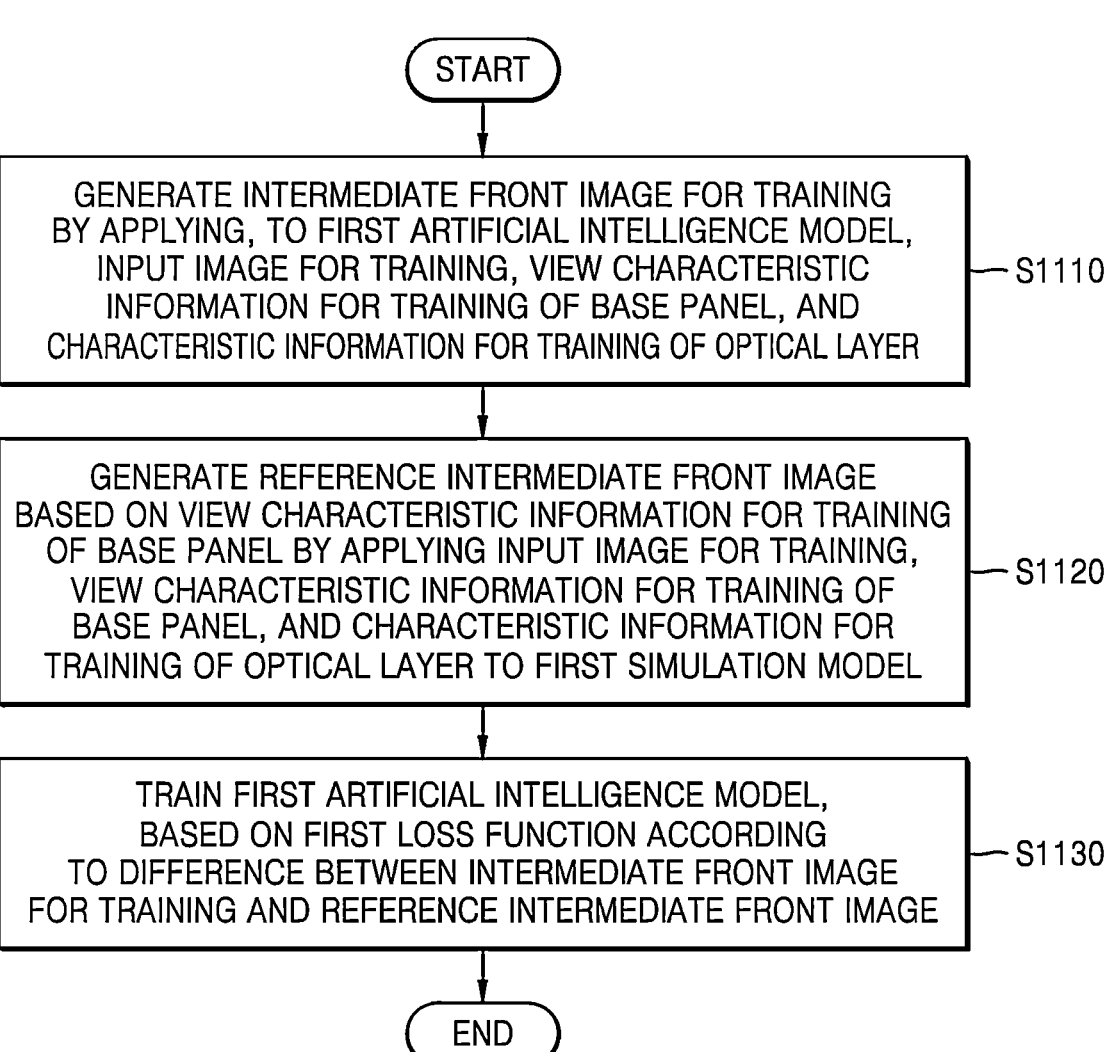

START

GENERATE INTERMEDIATE FRONT IMAGE FOR TRAINING
BY APPLYING, TO FIRST ARTIFICIAL INTELLIGENCE MODEL,
INPUT IMAGE FOR TRAINING, VIEW CHARACTERISTIC
INFORMATION FOR TRAINING OF BASE PANEL, AND
CHARACTERISTIC INFORMATION FOR TRAINING OF OPTICAL LAYER ⎯ S1110

GENERATE REFERENCE INTERMEDIATE FRONT IMAGE
BASED ON VIEW CHARACTERISTIC INFORMATION FOR TRAINING
OF BASE PANEL BY APPLYING INPUT IMAGE FOR TRAINING,
VIEW CHARACTERISTIC INFORMATION FOR TRAINING OF
BASE PANEL, AND CHARACTERISTIC INFORMATION FOR
TRAINING OF OPTICAL LAYER TO FIRST SIMULATION MODEL ⎯ S1120

TRAIN FIRST ARTIFICIAL INTELLIGENCE MODEL,
BASED ON FIRST LOSS FUNCTION ACCORDING
TO DIFFERENCE BETWEEN INTERMEDIATE FRONT IMAGE
FOR TRAINING AND REFERENCE INTERMEDIATE FRONT IMAGE ⎯ S1130

END

ELECTRONIC DEVICE FOR DISPLAYING 3D IMAGE AND OPERATION METHOD THEREOF

CROSS-REFERENCE TO RELATED APPLICATIONS

This application is a continuation application of International Application No. PCT/KR2023/014831 designating the United States, filed on Sep. 26, 2023, in the Korean Intellectual Property Receiving Office and claiming priority to Korean Patent Application No. 10-2022-0124662, filed on Sep. 29, 2022, and Korean Patent Application No. 10-2023-0011114, filed on Jan. 27, 2023, the disclosures of which are all hereby incorporated by reference herein in their entireties.

BACKGROUND

Technical Field

Certain example embodiments relate to an electronic device for displaying a three-dimensional (3D) image and/or an operating method of the electronic device.

Description of Related Art

With the development in the electronic technology, various types of electronic devices have been developed and supplied. An electronic device including a display device for displaying an image has been rapidly developed in recent years.

With the developments in electronic devices, types of images displayed by the electronic devices have diversified. A display device capable of displaying not only a two-dimensional (2D) image but also a three-dimensional (3D) image is being developed.

Recently, in order to display a 3D image, a device for displaying the 3D image by using a volumetric display capable of displaying an object in a 3D space, and a method thereof have been proposed. In particular, a stacked display that includes a plurality of stacked display panels and provides a 3D image by displaying an image on each of the plurality of display panels has been proposed.

The stacked display may display the 3D image by displaying a plurality of images respectively on the plurality of stacked display panels, the plurality of images being obtained based on light field images captured from different views.

SUMMARY

According to an example embodiment, an electronic device for displaying an image may include a base panel, an optical layer provided on, directly or indirectly, the base panel, and a front panel provided on, directly or indirectly, the optical layer. The electronic device may include a user tracking sensor configured to obtain a viewing angle of a user viewing the image. The electronic device may include a memory storing at least one instruction, and at least one processor, comprising processing circuitry, configured to execute the at least one instruction stored in the memory. The at least one processor may be configured to individually and/or collectively obtain an input image including a plurality of view images respectively corresponding to a plurality of different viewing angles. The at least one processor may be configured to generate a base image by decomposing the input image by using a base image generation model. The at least one processor may be configured to generate a front image corresponding to a viewing angle of the user by decomposing the input image by using a front image generation model, based on view characteristic information of the base panel which corresponds to the viewing angle of the user, view characteristic information of the front panel which corresponds to the viewing angle of the user, and characteristic information of the optical layer. The at least one processor may be configured to provide the image to the user by displaying the base image on the base panel and displaying the front image on the front panel.

According to an example embodiment, an operating method of an electronic device including a base panel, an optical layer provided on the base panel, and a front panel provided on the optical layer, and displaying an image may be provided. The operating method of the electronic device may include obtaining an input image including a plurality of view images respectively corresponding to a plurality of different viewing angles. The operating method of the electronic device may include obtaining a viewing angle of a user viewing the image. The operating method of the electronic device may include generating a base image by decomposing the input image by using a base image generation model. The operating method of the electronic device may include generating a front image corresponding to a viewing angle of the user by decomposing the input image by using a front image generation model, based on view characteristic information of the base panel which corresponds to the viewing angle of the user, view characteristic information of the front panel which corresponds to the viewing angle of the user, and characteristic information of the optical layer. The operating method of the electronic device may include providing the image to the user by displaying the base image on the base panel and displaying the front image on the front panel.

As an example embodiment, a computer-readable recording medium having recorded thereon a program for performing, on a computer, at least one method among the methods of any of the disclosed embodiment(s) may be provided.

BRIEF DESCRIPTION OF DRAWINGS

The present disclosure will now be described more fully through the detailed descriptions below with reference to the accompanying drawings, in which reference numerals denote structural elements.

FIG. 11 is a flowchart for describing the method of training a first artificial intelligence model included in a first front image generation model, according to an example embodiment.

DETAILED DESCRIPTION

Figure 1:
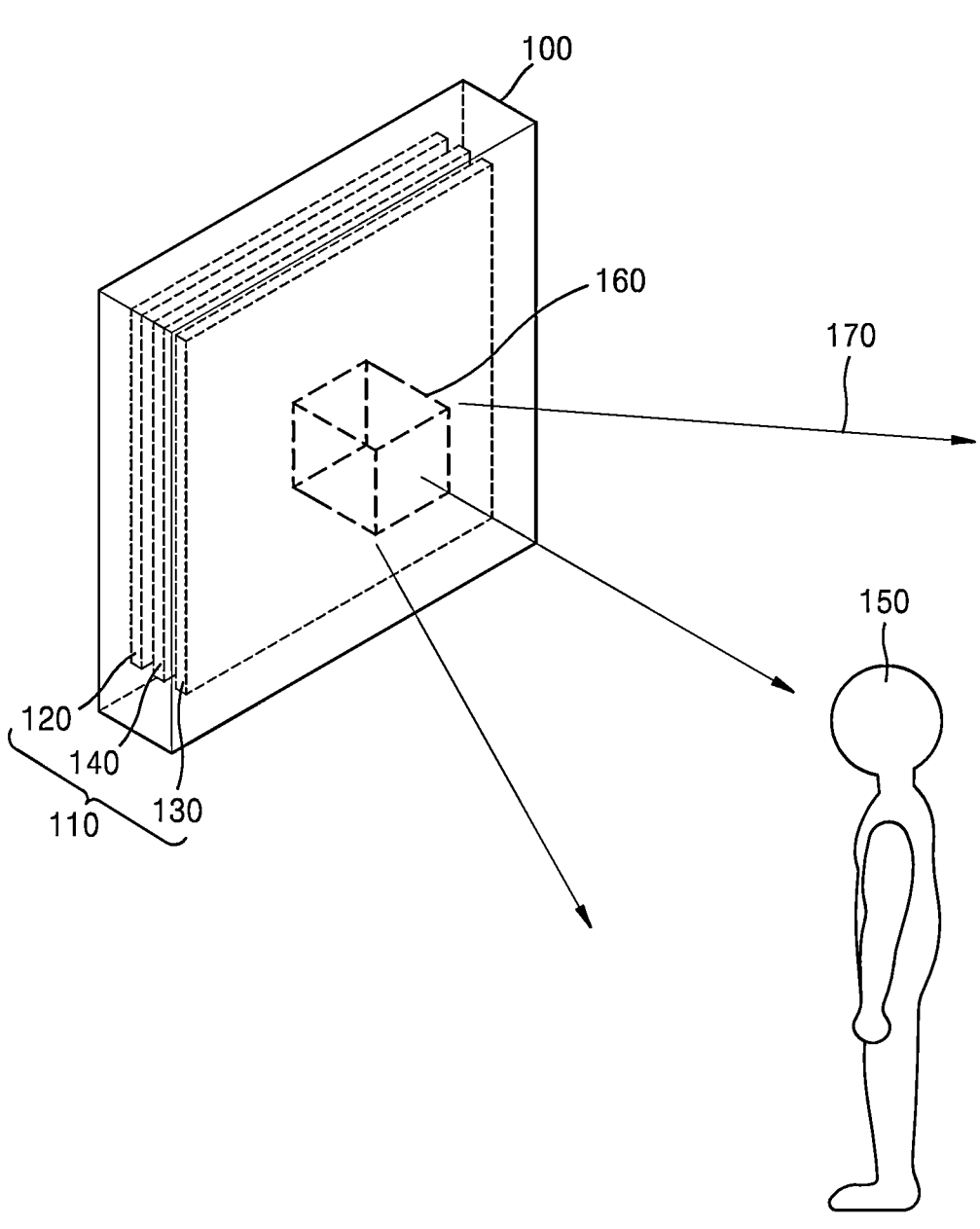
FIG. 1 is a diagram for describing an electronic device according to an example embodiment.

The terms used in the present disclosure will be briefly defined, and an example embodiment will be described in detail.

Although the terms used in the present disclosure are selected from among common terms that are currently widely used in consideration of their functions in an example embodiment, the terms may vary according the intention of one of ordinary skill in the art, a precedent, or the advent of new technology. Also, in particular cases, the terms are discretionally selected by the applicant, and the meaning of those terms will be described in detail in the corresponding part of the detailed description of an example embodiment. Therefore, the terms used in the present disclosure are not merely designations of the terms, but the terms are defined based on the meaning of the terms and content throughout the present disclosure.

As used herein, the singular forms may include the plural forms as well, unless the context clearly indicates otherwise. Unless otherwise defined, all terms including technical or scientific terms used herein may have the same meanings as commonly understood by one of ordinary skill in the art of the present disclosure.

Also, in the present disclosure, when a part "includes" or "comprises" an element, unless there is a particular description contrary thereto, the part can further include other elements, not excluding the other elements. Also, the terms such as " . . . unit," "module," or the like used in the present disclosure indicate a unit, which processes at least one function or operation, and the unit may be implemented by hardware or software, or by a combination of hardware and software. Thus, each "module" herein may comprise circuitry.

The expression "configured to (or set to)" used in the present disclosure may be replaced with, for example, "suitable for," "having the capacity to," "designed to," "adapted to," "made to," or "capable of" according to cases. The expression "configured to (or set to)" may not necessarily mean "specifically designed to" in a hardware level. Instead, in some cases, the expression "system configured to . . . " may mean that the system is "capable of . . . " along with other devices or parts. For example, "a processor configured to (or set to) perform A, B, and C" may refer to a dedicated processor (e.g., an embedded processor) for performing a corresponding operation, or a general-purpose processor (e.g., a central processing unit (CPU) or an application processor (AP)) capable of performing a corresponding operation by executing one or more software programs stored in a memory.

Also, in the present disclosure, it should be understood that when elements are "connected" or "coupled" to each other, the elements may be directly connected or coupled to each other, but may alternatively be connected or coupled to each other with an element(s) therebetween, unless specified otherwise. Thus, "connected" as used herein covers both direct and indirect connections.

Hereinafter, an example embodiment will be described in detail with reference to the accompanying drawings to allow one of skill in the art to easily implement the embodiment. However, the present disclosure may be embodied in many different forms and should not be construed as being limited to an embodiment set forth herein. In addition, in the drawings, parts irrelevant to the description are omitted to clearly describe an example embodiment, and like elements are denoted by like reference numerals throughout the present disclosure.

Hereinafter, embodiments of the present disclosure will be described in detail with reference to the drawings.

FIG. 1 is a diagram for describing an electronic device according to an example embodiment.

Referring to FIG. 1, an electronic device 100 as an example embodiment may include a display 110. The electronic device 100 may receive an input image 180 (see FIG. 3). The electronic device 100 may provide an image 160 to a user 150 via a display 110, the image 160 being generated based on the received input image 180.

In an embodiment, the input image 180 may include information about the image 160 which is attempted to be provided to the user 150 via the electronic device 100. In an embodiment, the input image 180 may be information obtained by photographing a real-world object at a plurality of different views. However, the present disclosure is not limited thereto, and the input image 180 may include information generated to provide images of an object at a plurality of different views to the user 150. In this regard, a 'view' may correspond to a position at which the user 150 can view another face of the object included in the image 160 displayed via the electronic device 100. The user 150 may view different faces of the object at respective views.

In an embodiment, the input image 180 may include a plurality of view images 181 (see FIG. 3) obtained by photographing a real-world object at a plurality of different views. In an embodiment, the plurality of view images 181 may be respective images obtained via a plurality of cameras that are aligned at different positions and photograph an object at a plurality of different views. In an embodiment, the plurality of view images 181 may be respective images obtained at different views via a camera including a micro lens array. Hereinafter, for convenience of descriptions, the plurality of view images 181 are defined as images obtained via a plurality of cameras that photograph an object at a plurality of different views.

In an embodiment, the image 160 that the electronic device 100 provides to the user 150 via the display 110 may vary according to positions of the user 150. In an embodiment, the image 160 provided by the electronic device 100 may be an image capable of providing a three dimensional effect to the user 150 who uses the electronic device 100.

In an embodiment, the electronic device 100 reproduces, via the image 160, light that is reflected from a real-world object and is provided to the user 150. In an embodiment, the electronic device 100 displays, and provides, to the user 150, light 170 having the same path as light that is reflected from a real-world object and is provided to the user 150. Accordingly, the user 150 may experience a three dimensional effect of an object included in the image 160 displayed in the electronic device 100, as the user views the real-world object.

In an embodiment, the electronic device 100 may provide the image 160 that varies according to a positional change of the user 150, thereby allowing the user 150 to experience the three dimensional effect of the object included in the image 160. Hereinafter, for convenience of descriptions, with reference to FIG. 1, it is described that the input image 180 includes images obtained by photographing a real-world object having a hexahedron shape, and provides the image 160 including another face of the object having the hexahedron shape to the user 150, according to a position of the user 150 who views the electronic device 100.

In an embodiment, when the user 150 is positioned in front of the electronic device 100, the electronic device 100 may provide the image 160 including a front face of the object to the user 150.

In an embodiment, when the user 150 is not positioned in front of the electronic device 100 but is positioned in a first direction crossing a direction perpendicular to the front of the electronic device 100, the electronic device 100 may provide the image 160 including a first side face and the front face of the object to the user 150. In an embodiment, according to an angle between the direction perpendicular to the front and the first direction, the first side face of the object and the front face of the object included in the image 160 that the electronic device 100 provides to the user 150 may vary. In an embodiment, according to the angle between the direction perpendicular to the front and the first direction, the electronic device 100 may provide the image 160 including only the first side face of the object to the user 150.

In an embodiment, when the user 150 is positioned in a second direction that crosses the direction perpendicular to the front of the electronic device 100 and is different from the first direction, the electronic device 100 may provide, to the user 150, the image 160 including the front face and a second side face of the object, the second side face being different from the first side face. In an embodiment, according to an angle between the direction perpendicular to the front and the second direction, the second side face of the object and the front face of the object included in the image 160 that the electronic device 100 provides to the user 150 may vary. In an embodiment, according to the angle between the direction perpendicular to the front and the second direction, the electronic device 100 may provide the image 160 including only the second side face of the object to the user 150.

In an embodiment, the first side face and the front face of the object may be areas of the object which are visible when the user 150 views the object in the real world in the first direction. In an embodiment, the second side face and the front face of the object may be areas of the object which are visible when the user 150 views the object in the real world in the second direction.

In an embodiment, the electronic device 100 may provide the image 160 that shows another face of an object to the user 150, according to a position of the user 150. Therefore, the user 150 may experience a three-dimensional effect of the object included in the image 160.

In an embodiment, the electronic device 100 may provide different images 160 respectively to a left eye and a right eye of the user 150, thereby allowing the user 150 to experience a binocular disparity. In an embodiment, a first direction may be a direction in which the user 150 views the electronic device 100 via the left eye. A second direction may be a direction in which the user 150 views the electronic device 100 via the right eye. As the images 160 provided to the right eye and the left eye of the user 150 are different, the user 150 may experience the binocular disparity, and thus, may feel the three-dimensional effect of the object.

In an embodiment, the display 110 may include a plurality of panels 120 and 130 and an optical layer 140. In an embodiment, the plurality of panels 120 and 130 and the optical layer 140 may be arranged by being stacked with respect to each other. Referring to FIG. 1, the display 110 includes two panels 120 and 130 and one optical layer 140 provided between the two panels 120 and 130, but the present disclosure is not limited thereto. The display 110 may include three or more panels or two or more optical layers.

In an embodiment, the display 110 may include the base panel 120, the front panel 130, and the optical layer 140 provided between the base panel 120 and the front panel 130. The electronic device 100 may generate a base image to be displayed on the base panel 120 and a front image to be displayed on the front panel 130, based on the input image 180.

In an embodiment, the base image and the front image may be generated by decomposing the input image 180. In an embodiment, the input image 180 may be represented as the product of the base image and the front image. In an embodiment, the electronic device 100 may provide the image 160 to the user 150 via light that has passed through a plurality of pixels included in the base panel 120 and a plurality of pixels included in the front panel 130. Therefore, when a plurality of pixels configuring the input image 180, the plurality of pixels included in the base panel 120, and the plurality of pixels included in the front panel 130 are each displayed in a matrix form, the electronic device 100 may generate a matrix corresponding to the base image and a matrix corresponding to the front image by using a matrix corresponding to the input image 180. In an embodiment, the matrix corresponding to the input image 180 may be represented as the product of the matrix corresponding to the base image and the matrix corresponding to the front image. For convenience of descriptions, that the matrix corresponding to the base image and the matrix corresponding to the front image which are configured, by being multiplied with each other, as the matrix corresponding to the input image 180 are generated is referred to as decomposition of the input image 180.

The electronic device 100 may generate the base image and the front image by decomposing the input image 180, may display the generated base image on the base panel 120, and may display the generated front image on the front panel 130, thereby providing the image 160 to the user 150. The electronic device 100 may generate the base image and the front image which indicate the plurality of view images 181 included in the input image 180.

In an embodiment, the image 160 as a combination of the base image displayed on the base panel 120 and the front image displayed on the front panel 130 may be provided to the user 150. In an embodiment, according to a position of the user 150, a portion of the base image displayed on the base panel 120 may pass through the optical layer 140 and may be combined with the front image displayed on the front panel 130, such that the image 160 may be provided to the user 150.

Therefore, the electronic device 100 may vary a combination of the base image and the front image provided to the user 150, based on a position of the user 150, and thus, may provide the image 160 with a three-dimensional effect to the user 150.

Figure 2:
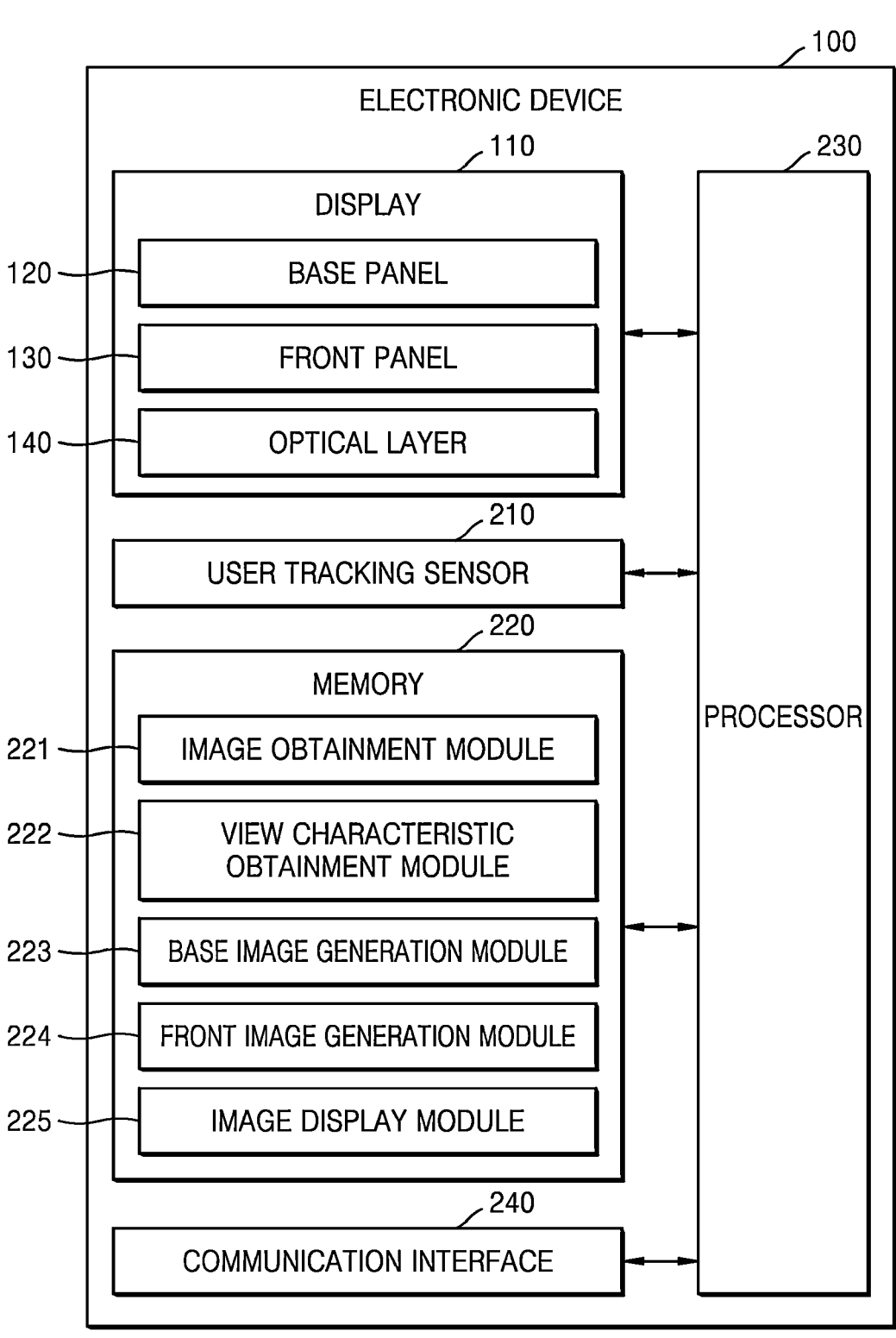
FIG. 2 is a block diagram for describing a configuration of an electronic device, according to an example embodiment.

FIG. 2 is a block diagram for describing a configuration of an electronic device, according to an example embodiment.

Referring to FIGS. 1 and 2, in an embodiment, the electronic device 100 may include the display 110, a user tracking sensor 210, a memory 220, at least one processor 230, and a communication interface 240. However, not all elements shown in FIG. 2 are necessary elements. The electronic device 100 may be embodied with more elements than the elements shown in FIG. 2 or may be embodied with fewer elements than the shown elements. In an embodiment, the display 110, the user tracking sensor 210, the memory 220, the at least one processor 230, and the communication interface 240 may be electrically and/or physically connected to each other. Each "processor" herein includes processing circuitry, and/or may include multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

In an embodiment, the display 110 may include any one display from among a liquid crystal display, an organic light emitting diode display, or an inorganic light emitting diode display. However, the present disclosure is not limited thereto, and the display 110 may include different types of a display capable of providing the image 160 to the user 150.

In an embodiment, the display 110 may include the base panel 120, the front panel 130, and the optical layer 140. The display 110 may include more elements than the elements shown in FIG. 2 or may include fewer elements than the shown elements. For example, the display 110 may include only the base panel 120 and the front panel 130. Also, the display 110 may further include a backlight 111 (see FIG. 3). Descriptions of the base panel 120, the front panel 130, and the optical layer 140 will be provided below with reference to FIGS. 3 and 4.

In an embodiment, the user tracking sensor 210 may obtain a viewing angle of the user 150 who views the image 160. The user tracking sensor 210 may include an RGB camera for obtaining an RGB image, an RGB-D camera for obtaining an RGB image and a depth image, a LiDAR for measuring a distance by using a laser, a time-of-flight (ToF) sensor, a motion sensor, etc., but the present disclosure is not limited thereto. In an embodiment, the user tracking sensor 210 may detect a position of the user 150 or a position of a head of the user 150. The user tracking sensor 210 may obtain a viewing angle of the user 150, based on the position of the user 150 or the position of the head of the user 150. In this regard, a "viewing angle" may be defined as an angle between a direction in which the user 150 or the head of the user 150 is positioned and a direction perpendicular to the front of the electronic device 100. In an embodiment, when the user 150 or the head of the user 150 is positioned in the direction perpendicular to the front of the electronic device 100, the user tracking sensor 210 may obtain the viewing angle of the user 150 as 0 degree. In an embodiment, when the user 150 or the head of the user 150 is positioned in a direction crossing the direction perpendicular to the front of the electronic device 100, the user tracking sensor 210 may obtain the viewing angle of the user 150 as a degree greater than 0 degree.

In an embodiment, the memory 220 may store instructions, a data structure, and program code which are readable by the at least one processor 230. In an embodiment, one or more memories 220 may be provided. In disclosed embodiments, operations performed by the at least one processor 230 may be implemented by executing instructions or codes of a program stored in the memory 220.

In an embodiment, the memory 220 may include at least one of a flash memory-type memory, a hard disk-type memory, a multimedia card micro-type memory, a card-type memory (e.g., secure digital (SD) or extreme digital (XD) memory), a random access memory (RAM), a static random access memory (SRAM), a read-only memory (ROM), an electrically erasable programmable read-only memory (EE-PROM), a programmable read-only memory (PROM), a mask ROM, flash ROM, a hard disk drive (HDD), or a solid state drive (SSD). The memory 220 may have stored therein instructions or program code for performing functions or operations of the electronic device 100. The instructions, an algorithm, the data structure, the program code, and an application program which are stored in the memory 330 may be implemented in, for example, programming or scripting languages such as C, C++, Java, assembler, etc.

In an embodiment, the memory 220 may have stored therein various types of modules that are usable in providing the image 160 to the user 150 via the display 110. The memory 220 may have stored therein an image obtainment module 221, a view characteristic obtainment module 222, a base image generation module 223, a front image generation module 224, and an image display module 225. However, not all modules shown in FIG. 2 are necessary modules. The memory 220 may have stored therein more elements than the elements shown in FIG. 2 or may have stored therein fewer elements than the shown elements. In an embodiment, the memory 220 may have further stored therein a module for pre-processing obtained input content.

In an embodiment, a 'module' included in the memory 220 may indicate a unit for processing a function or an operation performed by the at least one processor 230. The 'module' included in the memory 220 may be implemented as software such as instructions, an algorithm, a data structure, or program code.

Figure 3:
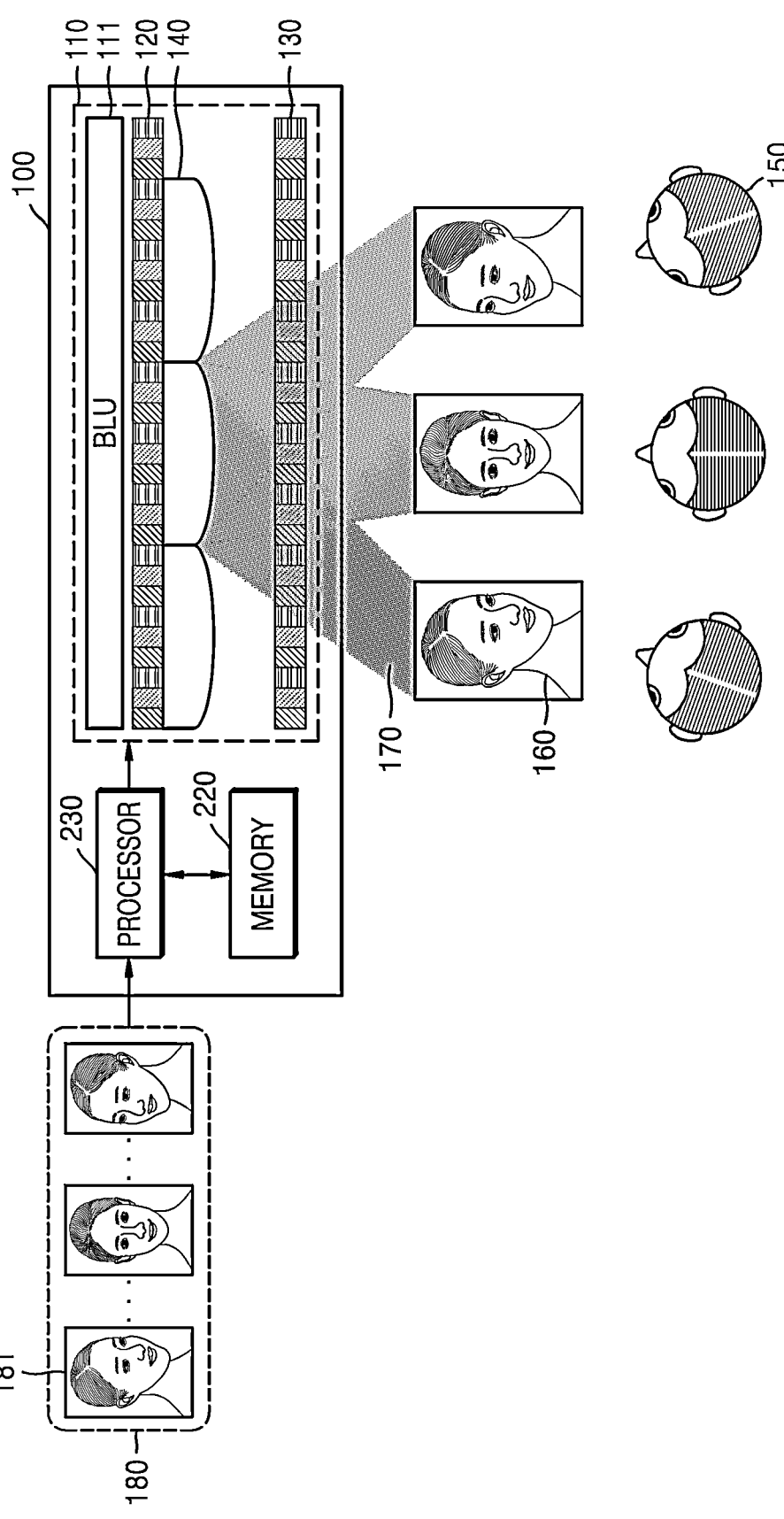
FIG. 3 is a diagram for describing an operation of an electronic device, according to an example embodiment.

In an embodiment, the image obtainment module 221 may include instructions or program code related to an operation or a function of obtaining the input image 180 (see FIG. 3). The image obtainment module 221 may include instructions or program code related to an operation or a function of receiving the input image 180 from an external server or neighboring electronic devices. The image obtainment module 221 may include an image obtainment model. Hereinafter, the input image 180 will be described in detail with reference to FIG. 3.

In an embodiment, the view characteristic obtainment module 222 may include instructions or program code related to an operation or a function of obtaining view characteristic information of the base panel 120 which corresponds to a viewing angle of the user 150, and view characteristic information of the front panel 130 which corresponds to the viewing angle of the user 150.

In an embodiment, base characteristic information of the base panel 120 may be defined as at least one piece of information of gamma, a color, a contrast ratio, luminance, or a gray of a base image displayed on the base panel 120, according to an angle at which the base panel 120 is viewed. In an embodiment, the base characteristic information of the base panel 120 may vary according to an angle at which the base panel 120 is viewed. However, the present disclosure is not limited thereto, and the characteristic information of the base panel 120 may vary according to a type of a display and a characteristic of the display included in the base panel 120.

In an embodiment, gamma, a color, a contrast ratio, luminance, and a gray of a base image of a case in which the base panel 120 is viewed at the front of the base panel 120 are different from gamma, a color, a contrast ratio, luminance, and a gray of a base image of a case in which the base panel 120 is viewed in a direction that is not the front of the base panel 120 but crosses a direction perpendicular to the front of the base panel 120.

In an embodiment, an angle at which the user 150 views the base panel 120, when the direction perpendicular to the front of the base panel 120 and the direction perpendicular to the front of the electronic device 100 are parallel, may be defined as a viewing angle. The base panel 120 may have a plurality of pieces of base characteristic information respectively corresponding to a plurality of different viewing angles.

In an embodiment, front characteristic information of the front panel 130 may be defined as at least one piece of information of gamma, a color, a contrast ratio, luminance, or a gray of a base image displayed on the front panel 130, according to an angle at which the front panel 130 is viewed. In an embodiment, the base characteristic information of the front panel 130 may vary according to an angle at which the front panel 130 is viewed. However, the present disclosure is not limited thereto, and the characteristic information of the front panel 130 may vary according to a type of a display and a characteristic of the display included in the front panel 130.

In an embodiment, gamma, a color, a contrast ratio, luminance, and a gray of a front image of a case in which the front panel 130 is viewed at the front of the front panel 130 are different from gamma, a color, a contrast ratio, luminance, and a gray of a front image of a case in which the front panel 130 the base panel 120 is viewed in a direction that is not the front of the front panel 130 but crosses a direction perpendicular to the front of the front panel 130.

In an embodiment, an angle at which the user 150 views the front panel 130, when the direction perpendicular to the front of the front panel 130 and the direction perpendicular to the front of the electronic device 100 are parallel, may be defined as a viewing angle. The front panel 130 may have a plurality of pieces of base characteristic information respectively corresponding to a plurality of different viewing angles.

In an embodiment, the view characteristic obtainment module 222 may obtain the view characteristic information of the base panel 120 corresponding to the obtained viewing angle of the user 150 from a lookup table that is pre-stored in the memory 220 and includes the plurality of pieces of base characteristic information of the base panel 120 which respectively correspond to the plurality of different viewing angles.

In an embodiment, the view characteristic obtainment module 222 may obtain the view characteristic information of the front panel 130 corresponding to the obtained viewing angle of the user 150 from a lookup table that is pre-stored in the memory 220 and includes the plurality of pieces of base characteristic information of the front panel 130 which respectively correspond to the plurality of different viewing angles.

However, the present disclosure is not limited thereto, and the view characteristic obtainment module 222 may obtain the view characteristic information of the base panel 120 and the view characteristic information of the front panel 130 which correspond to the obtained viewing angle of the user 150, from lookup tables stored in an external server or neighboring electronic devices.

In an embodiment, the base image generation module 223 may include instructions or program code related to an operation or a function of generating a base image to be displayed on the base panel 120, based on the obtained input image 180. In an embodiment, the base image generation module 223 may include instructions or program code related to an operation or a function of generating, by decomposing the input image 180, a base image configuring the input image 180. In an embodiment, the base image generation module 223 may include instructions or program code related to an operation or a function of generating, by decomposing the input image 180, a base image including a tensor capable of representing the input image 180 as the product with a front image to be described below. Hereinafter, for convenience of descriptions, decomposition of the input image 180 may be referred to as factorization being performed on the input image 180.

In an embodiment, the base image generation module 223 may include instructions or program code related to an operation or a function of generating a base image by performing factorization on the input image 180.

In an embodiment, the base image generation module 223 may include an artificial intelligence model configured to infer a base image by performing factorization on the input image 180. In an embodiment, the artificial intelligence model included in the base image generation module 223 may include a machine learning model or a deep learning model.

In an embodiment, the artificial intelligence model included in the base image generation module 223 may be the artificial intelligence model trained to infer an base image by receiving an input of the input image 180, wherein the base image may be displayed on the base panel 120 and may be combined with an existing front image displayed on the front panel 130 so as to generate the image 160. In an embodiment, the artificial intelligence model included in the base image generation module 223 may be the model configured to infer a base image by performing factorization on the input image 180, the model being a portion of a model trained to infer the base image and a not-corrected front image for generating the image 160. In an embodiment, the existing front image may not be a front image that is generated by the electronic device 100 and the operating method of the electronic device 100 of the present disclosure and corresponds to the obtained viewing angle of the user 150 but may be a front image generated based on the input image 180, regardless of the viewing angle of the user 150.

In an embodiment, the base image generation module 223 may include a base image generation model configured to perform factorization.

In an embodiment, the front image generation module 224 may include instructions or program code related to an operation or a function of generating a front image to be displayed on the front panel 130, based on the input image 180, the view characteristic information of the base panel 120 which corresponds to a viewing angle of the user 150, the view characteristic information of the front panel 130 which corresponds to the viewing angle of the user 150, and characteristic information of the optical layer 140.

In an embodiment, the front image generation module 224 may include instructions or program code related to an operation or a function of generating, by decomposing the input image 180, a front image configuring the input image 180, based on the view characteristic information of the base panel 120 which corresponds to a viewing angle of the user 150, the view characteristic information of the front panel 130 which corresponds to the viewing angle of the user 150, and the characteristic information of the optical layer 140.

In an embodiment, the front image generation module 224 may decompose the input image 180, under conditions of the view characteristic information of the base panel 120 which corresponds to a viewing angle of the user 150, the view characteristic information of the front panel 130 which corresponds to the viewing angle of the user 150, and the characteristic information of the optical layer 140.

In an embodiment, the front image generation module 224 may include instructions or program code related to an operation or a function of generating a front image including a tensor capable of representing the input image 180 as the product with a base image, under the conditions of the view characteristic information of the base panel 120 which corresponds to a viewing angle of the user 150, the view characteristic information of the front panel 130 which corresponds to the viewing angle of the user 150, and the characteristic information of the optical layer 140.

Hereinafter, that factorization is performed under the conditions of the view characteristic information of the base panel 120 which corresponds to a viewing angle of the user 150, the view characteristic information of the front panel 130 which corresponds to the viewing angle of the user 150, and the characteristic information of the optical layer 140 may indicate that the factorization is performed based on the view characteristic information of the base panel 120 which corresponds to a viewing angle of the user 150, the view characteristic information of the front panel 130 which corresponds to the viewing angle of the user 150, and the characteristic information of the optical layer 140.

In an embodiment, the front image generation module 224 may include instructions or program code related to an operation or a function of generating a front image by performing factorization on the input image 180, based on the view characteristic information of the base panel 120 which corresponds to a viewing angle of the user 150, the view characteristic information of the front panel 130 which corresponds to the viewing angle of the user 150, and the characteristic information of the optical layer 140.

In an embodiment, the front image generation module 224 may include an artificial intelligence model configured to infer a front image by performing factorization on the input image 180, based on the view characteristic information of the base panel 120 which corresponds to a viewing angle of the user 150, the view characteristic information of the front panel 130 which corresponds to the viewing angle of the user 150, and the characteristic information of the optical layer 140. In an embodiment, the artificial intelligence model included in the front image generation module 224 may include a machine learning model or a deep learning model.

In an embodiment, the artificial intelligence model included in the front image generation module 224 may be the artificial intelligence model that is trained to infer a front image to be displayed on the front panel 130, and is capable of generating the image 160 as a combination of the input image 180 and a base image displayed on the base panel 120, by receiving an input of the view characteristic information of the base panel 120 which corresponds to a viewing angle of the user 150, the view characteristic information of the front panel 130 which corresponds to the viewing angle of the user 150, the characteristic information of the optical layer 140, and the input image 180.

In an embodiment, the front image generation module 224 may include a front image generation model configured to perform factorization. In an embodiment, when a front image generated by a base image generation module is the existing front image, a front image generated by the front image generation module 224 may be a front image to which the view characteristic information of the base panel 120 which corresponds to a viewing angle of the user 150, the view characteristic information of the front panel 130 which corresponds to the viewing angle of the user 150, and the characteristic information of the optical layer 140 are reflected, compared to the existing front image. Therefore, even when a viewing angle at which the user 150 views the image 160 becomes different, the image 160 with a uniform quality may be provided to the user 150 via the combination of the base image and the front image that corresponds to the obtained viewing angle of the user 150.

In an embodiment, the front image generation module 224 may include a front image generation model configured to perform factorization.

In an embodiment, the artificial intelligence model included in the base image generation module 223 and the artificial intelligence model included in the front image generation module 224 may include a plurality of neural network layers. Each neural network layer may have a plurality of weight values, and may perform an operation of a present neural network layer via an operation between an operation result of a previous layer and the plurality of weight values. Examples of the artificial intelligence model may include a convolutional neural network (CNN), a deep neural network (DNN), a recurrent neural network (RNN), a restricted Boltzmann machine (RBM), a deep belief network (DBN), a bidirectional recurrent deep neural network (BRDNN), a deep Q-network, a generative adversarial network (GAN), a conditional generative adversarial network (CGAN), a deep convolutional generative adversarial network (DCGAN), a variational auto encoder (VAE), etc., and the artificial intelligence model included in the base image generation module 223 and the artificial intelligence model included in the front image generation module 224 are not limited to the aforementioned example.

Hereinafter, the front image generation model and a front image generated by the front image generation model will be described below with reference to FIGS. 5 to 9.

In an embodiment, the electronic device 100 may train the artificial intelligence model included in the base image generation module 223. The electronic device 100 may perform transfer learning using a pre-trained model, so as to train the artificial intelligence model included in the base image generation module 223. However, the present disclosure is not limited thereto, and the base image generation module 223 may receive an artificial intelligence model trained to infer a base image by performing factorization on the input image 180, from an external server or neighboring electronic devices via the communication interface 240.

In an embodiment, the electronic device 100 may train the artificial intelligence model included in the front image generation module 224. The electronic device 100 may perform transfer learning using a pre-trained model, so as to train the artificial intelligence model included in the front image generation module 224. However, the present disclosure is not limited thereto, and the electronic device 100 may receive an artificial intelligence model trained to infer a front image by performing factorization on the input image 180, based on the view characteristic information of the base panel 120 which corresponds to a viewing angle of the user 150, the view characteristic information of the front panel 130 which corresponds to the viewing angle of the user 150, and the characteristic information of the optical layer 140, from an external server or neighboring electronic devices via the communication interface 240. Hereinafter, a method of training the artificial intelligence model included in the front image generation module 224 will be described below with reference to FIGS. 10 to 15.

In an embodiment, the image display module 225 may include instructions or program code related to an operation or a function of displaying a base image on the base panel 120 and displaying a front image on the front panel 130. The at least one processor 230 may execute the image display module 225 to display the base image on the base panel 120 and to display the front image on the front panel 130.

In an embodiment, the memory 220 may further store a pre-processing module configured of instructions or program code related to an operation or a function of pre-processing the obtained input image 180. The pre-processing module may include instructions or program code related to an operation or a function of pre-processing the input image 180 by performing wrangling, transformation, integration, cleaning, reduction, discretization, etc. The base image generation module 223 may generate a base image based on an input image pre-processed via the pre-processing module. The front image generation module 224 may generate a front image by performing factorization on the pre-processed input image, based on the view characteristic information of the base panel 120 which corresponds to a viewing angle of the user 150, the view characteristic information of the front panel 130 which corresponds to the viewing angle of the user 150, and the characteristic information of the optical layer 140.

In an embodiment, the memory 220 may further include the characteristic information of the optical layer 140. The characteristic information of the optical layer 140 may include at least one piece of information among a refractive index of the optical layer 140, a focal length, shapes of lenses included in the optical layer 140, sizes of the lenses included in the optical layer 140, and the number of the lenses included in the optical layer 140. However, the present disclosure is not limited thereto, and the characteristic information of the optical layer 140 may include a plurality of pieces of information for describing that light incident on the optical layer 140 is refracted, reflected, dispersed, etc.

In an embodiment, the at least one processor 230 may be configured as at least one of a central processing unit, a microprocessor, a graphics processing unit, an application processor (AP), application specific integrated circuits (ASICs), digital signal processors (DSPs), digital signal processing devices (DSPDs), programmable logic devices (PLDs), field programmable gate arrays (FPGAs), a neural processing unit, or an artificial intelligence (AI)-dedicated processor having a hardware structure specialized for training and processing of an AI model, but the present disclosure is not limited thereto.

In an embodiment, the communication interface 240 may perform data communication with an external server, under the control of the at least one processor 230. Also, the communication interface 240 may perform data communication with not only the external server but also with other neighboring electronic devices. In an embodiment, the communication interface 240 may perform data communication with a server or neighboring electronic devices by using at least one of data communication schemes including wired local area network (LAN), wireless LAN, Wi-Fi, Bluetooth, ZigBee, Wi-Fi direct (WFD), infrared data association (IrDA), Bluetooth low energy (BLE), Near Field Communication (NFC), wireless broadband Internet (WiBro), World interoperability for microwave access (WiMAX), shared wireless access protocol (SWAP), wireless gigabit alliance (WiGig), and radio frequency (RF) communication.

In an embodiment, the at least one processor 230 may receive the input image 180 from an external server or neighboring electronic devices via the communication interface 240. In an embodiment, the at least one processor 230 may receive the artificial intelligence model included in the base image generation module 223 or the artificial intelligence model included in the front image generation module 224 from the external server or the neighboring electronic devices via the communication interface 240.

FIG. 3 is a diagram for describing an operation of an electronic device, according to an example embodiment. Hereinafter, elements that are the same as those described with reference to FIG. 2 are rendered the same reference numeral, and redundant explanations are omitted.

Referring to FIG. 3, the electronic device 100 may include the display 110, the memory 220 storing at least one instruction, and the at least one processor 230. The at least one processor 230 may execute the at least one instruction included in the memory 220 to control an operation of the electronic device 100. In an embodiment, the display 110 may include the backlight 111, the base panel 120, the front panel 130, and the optical layer 140.

FIG. 3 illustrates the input image 180 including a human face. However, the illustration of FIG. 3 is merely for convenience of descriptions, and a real-world object is not limited to a shape of the human face. The input image 180 may include information obtained by photographing various types of objects.

In an embodiment, the electronic device 100 may be provided the input image 180. In an embodiment, the at least one processor 230 included in the electronic device 100 may receive the input image 180. The at least one processor 230 may execute the at least one instruction included in the memory 220 to generate a base image to be displayed on the base panel 120 and a front image to be displayed on the front panel 130, based on the input image 180. The at least one processor 230 may display the base image on the base panel 120, may display the front image on the front panel 130, and thus, may provide, to the user 150, the image 160 in which a photographed object is reproduced.

Hereinafter, generation of the base image and the front image by the at least one processor 230 will be described below with reference to FIGS. 5 to 9.

In an embodiment, the user 150 may view an image corresponding to a view that corresponds to a viewing angle of the user 150. In an embodiment, when the user 150 is positioned at the front of the electronic device 100 (e.g., when a viewing angle is 0 degree), the user 150 at the viewing angle may view, via the image 160, a face of an object which is visible at a view corresponding to a front face of a real-world object. In an embodiment, when the user 150 is not positioned at the front but is positioned at the side of the electronic device 100 (e.g., when a viewing angle is greater than 0 degree), the user 150 at the viewing angle may view, via the image 160, a face of the object which is visible at a view corresponding to a side face of the real-world object. In an embodiment, the backlight 111 may generate and provide light to the user 150. In an embodiment, the light generated by the backlight 111 may be white light. However, the present disclosure is not limited thereto, and the light provided by the backlight 111 may have a color other than a white color.

In an embodiment, each of the base panel 120 and the front panel 130 may include a plurality of pixels. In an embodiment, when the display 110 is a liquid crystal display, each of the base panel 120 and the front panel 130 may be a filter layer including a plurality of color filters. In an embodiment, a plurality of pixels may respectively correspond to the plurality of color filters.

In an embodiment, at least one of the base panel 120 or the front panel 130 may include a plurality of red, green, and blue pixels. In an embodiment, at least one of the base panel 120 or the front panel 130 may include the plurality of red, green, and blue pixels, and openings that do not filter light. In an embodiment, at least one of the base panel 120 or the front panel 130 may include a plurality of yellow and blue pixels.

However, the present disclosure is not limited thereto, and the base panel 120 may include a plurality of pixels having different colors, and the front panel 130 may include a plurality of pixels one color (monochrome). The front panel 130 may be a filter layer including a monochrome color filter.

However, the present disclosure is not limited thereto. In an embodiment, according to a wavelength of light provided by the backlight 111 and a combination of colors for displaying the image 160 by using light provided by the backlight 111, colors of the plurality of pixels included in the base panel 120 and the front panel 130 may vary.

In an embodiment, resolution of the base panel 120 and resolution of the front panel 130 may be different from each other. The resolution of the front panel 130 may be equal to or greater than the resolution of the base panel 120.

In an embodiment, it may be assumed that light passing through the base panel 120 is a base image to be displayed on the base panel 120 and light passing through the front panel 130 is a front image to be displayed on the front panel 130. In this regard, the base image may include information about transmittance, colors, etc. of a plurality of pixels that correspond to the light passing through the base panel 120. The front image may include information about transmittance, colors, etc. of a plurality of pixels that correspond to the light passing through the front panel 130.

In an embodiment, light 170 provided by the backlight 111 may be provided to the user 150 by passing through each of the base panel 120, the optical layer 140, and the front panel 130.

In an embodiment, the light 170 generated by the backlight 111 may be provided to the user 150 by passing through any one pixel included in the base panel 120 and any one pixel included in the front panel 130. According to at least one of a color or transmittance of each of pixels of the base panel 120 and pixels of the front panel 130 through which the light 170 generated by the backlight 111 is passed, a wavelength and intensity of the light 170 provided to the user 150 may be determined. According to a combination of a pixel of the base panel 120 and a pixel of the front panel 130 through which the light 170 generated by the backlight 111 is passed, a wavelength and intensity of the light 170 provided to the user 150 may be determined.

In this regard, a pixel of the base panel 120 and a pixel of the front panel 130 through which the light 170 generated by the backlight 111 is passed to reach the user 150 may vary, according to a position of the user 150. In detail, a color or transmittance of each of a pixel of the base panel 120 and a pixel of the front panel 130 through which the light 170 generated by the backlight 111 is passed to reach the user 150 may vary, according to a position of the user 150. In an embodiment, a combination of a pixel of the base panel 120 and a pixel of the front panel 130 through which the light 170 generated by the backlight 111 is passed to reach the user 150 may vary, according to a position of the user 150.

In an embodiment, when the display 110 includes the optical layer 140, the light 170 provided by the backlight 111 may be provided to the user 150 by passing through the base panel 120, being refracted by the optical layer 140, and then passing through the front panel 130. The light of which path is changed by being refracted by the optical layer 140 may be provided to the user 150 at a position corresponding to the changed path.

In an embodiment, the optical layer 140 may be provided between the base panel 120 and the front panel 130. The light 170 provided by the base panel 120 may be provided to the front panel 130 by being refracted, reflected, or dispersed while passing through the optical layer 140. FIG. 3 illustrates that the optical layer 140 is provided between the base panel 120 and the front panel 130, but the present disclosure is not limited thereto. In an embodiment, when the display 110 includes three or more panels, the optical layer 140 may be provided in a place other than a gap between the base panel 120 and the front panel 130. Also, in an embodiment, the optical layer 140 may be omitted. Hereinafter, for convenience of descriptions, it is described that the light 170 that passes through the optical layer 140 is refracted.

In an embodiment, the optical layer 140 may include a lens array including at least one lens. In an embodiment, the optical layer 140 may include at least one lens. FIG. 3 illustrates that the optical layer 140 includes three lenses, but the present disclosure is not limited thereto. The optical layer 140 may include two lenses or less or at least four lenses.

In an embodiment, according to a positional relation between a pixel included in the base panel 120 and at least one lens included in the optical layer 140, the number, a shape, and a refractive index of the at least one lens, the light 170 that has passed through the base panel 120 may be refracted, and thus, a path toward the front panel 130 may be changed. The light of which path has been refracted by the optical layer 140 may pass through the front panel 130, and may be provided to the user 150 who views the electronic device 100 at a position corresponding to the path. Therefore, light that has passed through a pixel of the base panel 120 and a pixel of the front panel 130, the pixels being different from each other, is provided to the user 150, according to a positional change by the user 150, so that the image 160 including different faces of an object according to the positional change by the user 150 may be provided.

However, the present disclosure is not limited thereto, and the optical layer 140 may include a parallax barrier. In an embodiment, the optical layer 140 may selectively transmit light that passes through the optical layer 140, according to a wavelength of the light, a path of the light, etc.

Hereinafter, for convenience of descriptions, it is described that the optical layer 140 includes a lens array.

However, the present disclosure is not limited thereto, and at least one of the base panel 120 or the front panel 130 may be a display in which each of the base panel 120 and the front panel 130 generates light by itself as an organic light-emitting diode display, an inorganic light-emitting diode display, etc. When both the base panel 120 and the front panel 130 are panels that generate light by itself, the display 110 may not include the backlight 111. In this case, the electronic device 100 may provide the different image 160 to the user 150 according to a position of the user 150, by adjusting intensity of light, a wavelength, and transmittance of each sub-panel, the light being generated in each panel.

In an embodiment, when a position of the user 150 corresponds to a view among a plurality of views, the electronic device 100 may provide the image 160 including a face of an object which corresponds to the view to the user 150, thereby allowing the user 150 to experience a three-dimensional effect.

In an embodiment, a base image included in the base panel 120 may include a plurality of sub-base images respectively corresponding to a plurality of different views. Light beams respectively from the plurality of sub-base images may be refracted by the optical layer 140 and then may be provided to the front panel 130. The light beams respectively from the plurality of sub-base images may be refracted to different paths by the optical layer 140 and then may be provided to the front panel 130. The plurality of sub-base images provided in the different paths to the front panel 130 may pass through different areas of a front image and then may be provided at respective views to the user 150.

Therefore, the electronic device 100 may provide, to the user 150, the image 160 that varies according to a positional change of the user 150. The user 150 may experience a three-dimensional effect of an object included in the image 160, based on that the image 160 provided by the electronic device 100 varies according to the positional change of the user 150.

Figure 4:
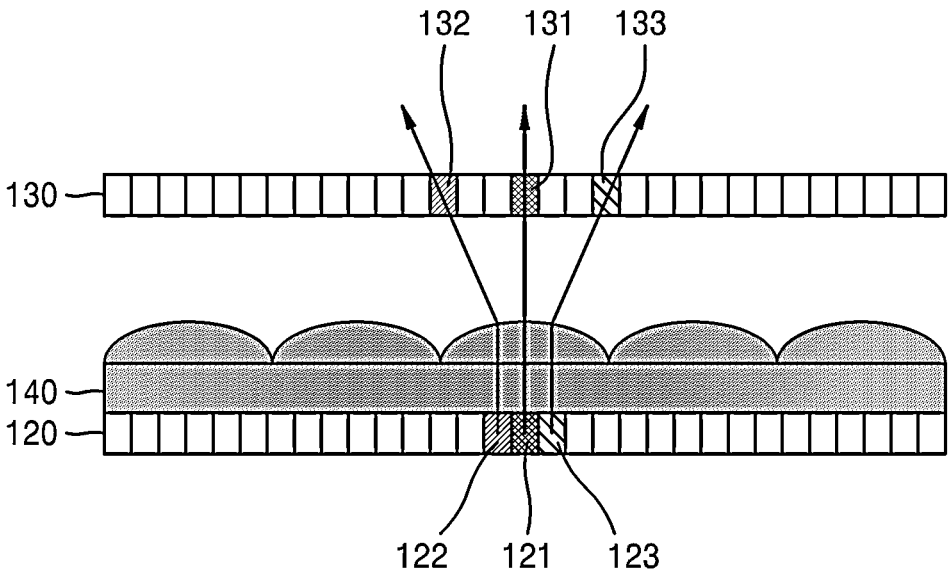
FIG. 4 is a diagram for describing an operation of an electronic device, according to an example embodiment.

FIG. 4 is a diagram for describing an operation of an electronic device, according to an example embodiment. Hereinafter, elements that are the same as those described with reference to FIGS. 2 and 3 are rendered the same reference numeral, and redundant explanations are omitted.

Referring to FIGS. 3 and 4, FIG. 4 illustrates the base panel 120, the optical layer 140, and the front panel 130 which are included in the display 110. In an embodiment, the optical layer 140 may be provided on, directly or indirectly, the base panel 120. The front panel 130 may be provided on, directly or indirectly, the optical layer 140. In an embodiment, the display 110 may further include the backlight 111 provided at a lower part of the base panel 120.

In an embodiment, each of the base panel 120 and the front panel 130 may include a plurality of pixels. In an embodiment, light provided from a backlight that is not shown may pass through one pixel among a plurality of pixels included in the base panel 120 and one pixel among a plurality of pixels included in the front panel 130 and then may be provided to the user 150.

In an embodiment, based on at least one of a size of at least one lens included in the optical layer 140, a shape of the lens, or a refractive index of the lens, a level of refraction by the optical layer 140 with respect to light that has passed the base panel 120 may be determined. The light that has passed the base panel 120 may be refracted by the optical layer 140, and thus, a path of the light may be changed, and then, the light may pass through the front panel 130 and may be provided to the user 150.

In an embodiment, base images 121, 122, and 123 displayed on the base panel 120 may include a first sub-base image 121, a second sub-base image 122, and a third sub-base image 123. FIG. 4 illustrates that each of the first sub-base image 121, the second sub-base image 122, and the third sub-base image 123 corresponds to a different one pixel, but the present disclosure is not limited thereto. Each of the first sub-base image 121, the second sub-base image 122, and the third sub-base image 123 may be an image that corresponds to two or more different pixels included in the base panel 120.

In an embodiment, each of the first, second, and third sub-base images 121, 122, and 123 may be refracted by the optical layer 140 and may be provided to the user 150 positioned at different views. Each of the first, second, and third sub-base images 121, 122, and 123 may be an image for providing another face of an object to the user 150 positioned at different views.

FIG. 4 illustrates that the base images 121, 122, and 123 include three sub-base images, but the present disclosure is not limited thereto. Based on at least one of resolution of the base panel 120, a size of at least one lens included in the optical layer 140, a shape of the lens, or a refractive index of the lens, the base images 121, 122, and 123 may include two sub-base images or at least four sub-base images.

In an embodiment, each of the first, second, and third sub-base images 121, 122, and 123 may be refracted by the optical layer 140, may pass through an area of the front panel 130, the area being in a corresponding light path, and then may be provided to the user 150.

In an embodiment, front images 131, 132, and 133 may include a first sub-front image 131, a second sub-front image 132, and a third sub-front image 133. The first sub-front image 131 may be an image that is the first sub-base image 121 that has passed through the optical layer 140 and then is displayed on an area of the front panel 130. The second sub-front image 132 may be an image that is the second sub-base image 122 that has passed through the optical layer 140 and then is displayed on an area of the front panel 130. The third sub-front image 133 may be an image that is the third sub-base image 123 that has passed through the optical layer 140 and then is displayed on an area of the front panel 130.

In an embodiment, the user 150 may be positioned at a view corresponding to the front of the electronic device 100 so as to view an image that is generated as a combination of the first sub-base image 121 and the first sub-front image 131. In an embodiment, the user 150 may be positioned at a view corresponding to a first side of the electronic device 100 so as to view an image that is generated as a combination of the second sub-base image 122 and the second sub-front image 132. In an embodiment, the user 150 may be positioned at a view corresponding to a second side of the electronic device 100 so as to view an image that is generated as a combination of the third sub-base image 123 and the third sub-front image 133.

In an embodiment, base characteristic information of the base panel 120 and front characteristic information of the front panel 130 may vary according to a view at which the electronic device 100 is viewed. Therefore, base characteristic information of the base panel 120 and front characteristic information of the front panel 130 when an image is viewed at a view corresponding to the front of the electronic device 100 may be different from base characteristic information of the base panel 120 and front characteristic information of the front panel 130 when an image is viewed at a view corresponding to the first side of the electronic device 100. Base characteristic information of the base panel 120 and front characteristic information of the front panel 130 when an image is viewed at a view corresponding to the second side of the electronic device 100 may be different from the base characteristic information and the front characteristic information when an image is viewed at a view corresponding to the front and a view corresponding to the first side of the electronic device 100.

Each of the first, second, and third sub-front images 131, 132, and 133 may provide another face of an object to the user 150 positioned at different views, and may be an image for compensating for a change in the base characteristic information and the front characteristic information according to a view of the user 150. Therefore, via the first, second, and third sub-base images 121, 122, and 123 and the first, second, and third sub-front images 131, 132, and 133, the electronic device 100 may provide, to the user 150, an image including different faces of an object according to a change in a view at which the electronic device 100 is viewed, and may provide the image 160 with a uniform quality.

Figure 5:
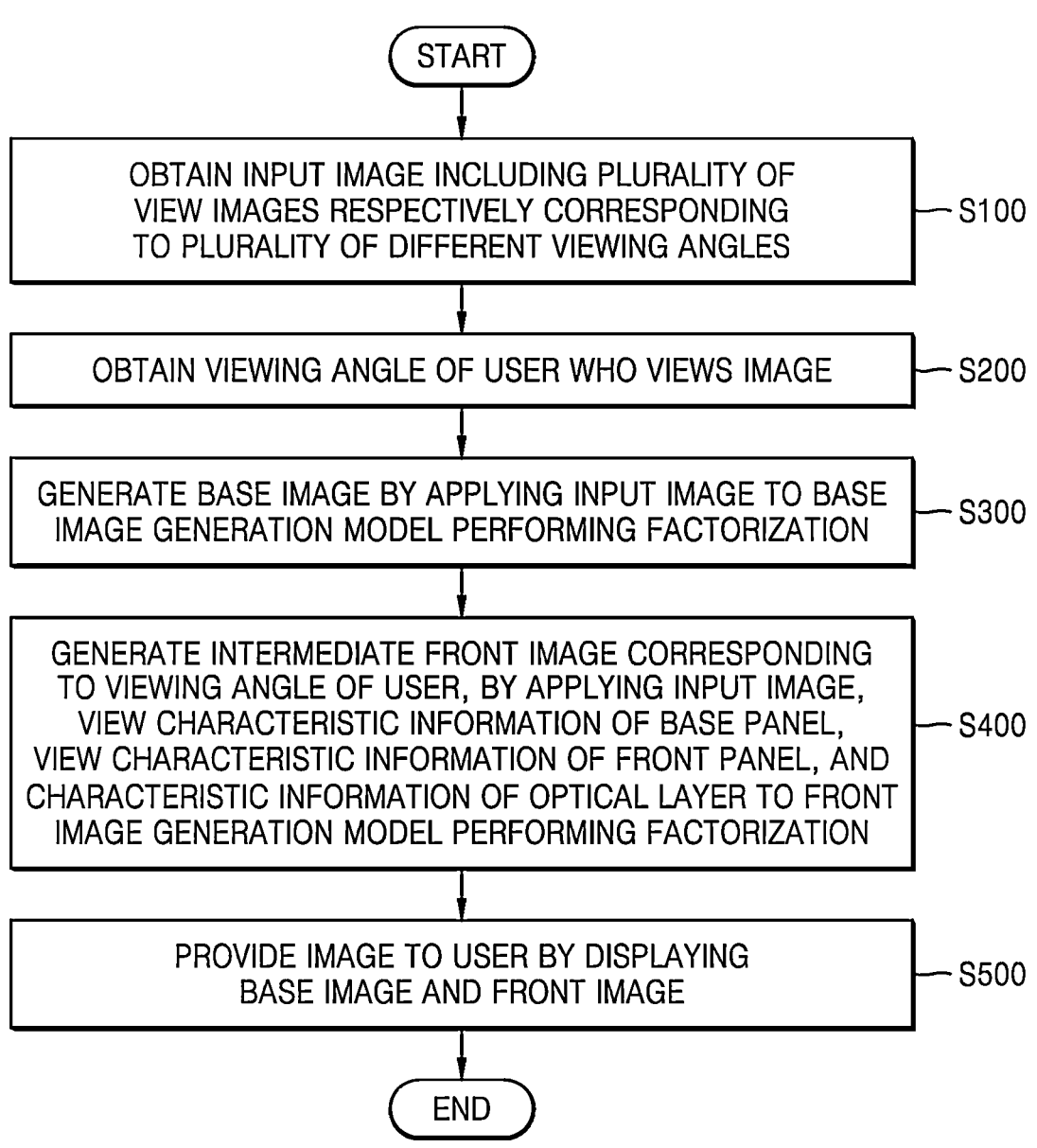
FIG. 5 is a flowchart for describing an operation of an electronic device, according to an example embodiment.
Figure 6:
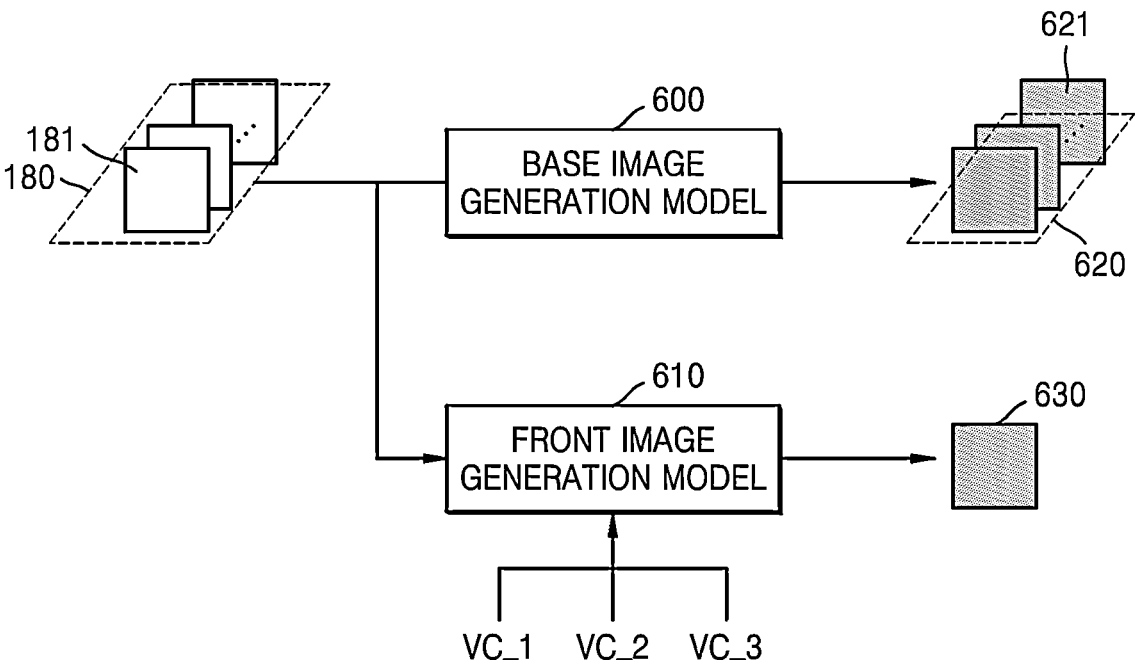
FIG. 6 is a diagram for describing an operation of an electronic device that generates a base image and a front image, according to an example embodiment.

FIG. 5 is a flowchart for describing an operation of an electronic device, according to an example embodiment. FIG. 6 is a diagram for describing an operation of an electronic device that generates a base image and a front image, according to an example embodiment.

Referring to FIGS. 2, 5, and 6, in an embodiment, an operating method of the electronic device 100 may include obtaining the input image 180 including the plurality of view images 181 respectively corresponding to a plurality of different viewing angles (S100). In an embodiment, in the obtaining of the input image 180 (S100), the at least one processor 230 may obtain the input image 180 by executing the image obtainment module 221.

In an embodiment, the operating method of the electronic device 100 may include obtaining a viewing angle of the user 150 who views the image 160 (S200). In an embodiment, in the obtaining of the viewing angle of the user 150 (S200), the at least one processor 230 may obtain the viewing angle of the user 150 by using the user tracking sensor 210.

In an embodiment, the operating method of the electronic device 100 may include generating a base image 620 by decomposing the input image 180 by using a base image generation model 600 (S300). In an embodiment, the base image 620 may include a plurality of sub-base images 621 respectively corresponding to the plurality of different views.

In an embodiment, the operating method of the electronic device 100 may include generating a front image 630 corresponding to the viewing angle of the user 150, by decomposing the input image 180, based on view characteristic information VC_1 of the base panel 120 which corresponds to a viewing angle of the user 150 obtained by using a front image generation model 610, view characteristic information VC_3 of the front panel 130 which corresponds to the obtained viewing angle of the user 150, and characteristic information VC_2 of the optical layer 140 (S400). In an embodiment, the front image 630 may be a front image generated by reflecting the view characteristic information VC_1 of the base panel 120, the view characteristic information VC_3 of the front panel 130, and the characteristic information VC_2 of the optical layer 140, according to the viewing angle of the user 150. In an embodiment, the front image generation module 224 included in the memory 220 may include the front image generation model 610. The front image generation model 610 will be described in detail below with reference to FIGS. 7 to 9.

In an embodiment, the operating method of the electronic device 100 may include providing the image 160 to the user 150 by displaying the base image 620 on the base panel 120 and displaying the front image 630 on the front panel 130 (S500). In the providing of the image 160 to the user 150 (S500), the at least one processor 230 may display the plurality of sub-base images 621 on the base panel 120, and may display the front image 630 on the front panel 130. In an embodiment, the plurality of sub-base images 621 may be images respectively including faces of an object which correspond to different views of the user 150. The user 150 may view, while changing a view at which the user 150 views the image 160, the image 160 generated as a combination of a sub-base image corresponding to a view at which the image 160 is viewed and the front image 630.

In an embodiment, a viewing angle of the user 150 may vary according to a position of a view at which the user 150 views the image 160. As the base characteristic information of the base panel 120 varies according to the viewing angle, at least one piece of information of gamma, a color, a contrast ratio, luminance, and a gray of the sub-base image provided to the user 150 may vary according to the viewing angle of the user 150.

However, the front image 630 to be combined with the sub-base image may be an image generated to provide, to the user 150, the image 160 in which gamma, a color, a contrast ratio, luminance, and a gray are constant, regardless of the viewing angle of the user 150, even when at least one piece of information of gamma, a color, a contrast ratio, luminance, or a gray of the sub-base image provided to the user 150 varies according to the viewing angle of the user 150.

In an embodiment, a viewing angle of the user at which the user 150 views the image 160 at the front of the electronic device 100 may be referred to as a reference viewing angle. Base characteristic information that corresponds to the reference viewing angle among a plurality of pieces of base characteristic information of the base panel 120 which respectively correspond to a plurality of viewing angles may be defined as reference base characteristic information. Front characteristic information that corresponds to the reference viewing angle among a plurality of pieces of front characteristic information of the front panel 130 which respectively correspond to the plurality of viewing angles may be defined as reference front characteristic information.

In an embodiment, the front image 630 may be an image for providing, to the user 150, the image 160 generated as a combination of a base image displayed based on the reference base characteristic information and a front image displayed based on the reference front characteristic information, regardless of a viewing angle of the user 150.

In an embodiment, the front image 630 may be an image generated based on a difference between view characteristic information of the base panel 120 which corresponds to the viewing angle of the user 150 and the reference base characteristic information and a difference between view characteristic information of the front panel 130 which corresponds to the viewing angle of the user 150 and the reference front characteristic information. The front image 630 may be an image generated to compensate for the difference between the view characteristic information of the base panel 120 and the reference base characteristic information and the difference between the view characteristic information of the front panel 130 and the reference front characteristic information, compared to an existing front image. Even when the user 150 views the image 160 not at a reference viewing angle but at another viewing angle, the electronic device 100 may provide, to the user 150, the image 160 displayed based on the reference base characteristic information and the reference front characteristic information at the reference viewing angle, via the base image 620 and the front image 630.

Therefore, in the displaying of the base image 620 and the front image 630 (S500), the electronic device 100 may provide a three-dimensional effect to the user 150 by providing the image 160 that varies according to a view corresponding to the viewing angle of the user 150, and may provide, to the user 150, the image 160 in which gamma, a color, a contrast ratio, luminance, and a gray are constant, regardless of the viewing angle of the user 150.

Figure 7:
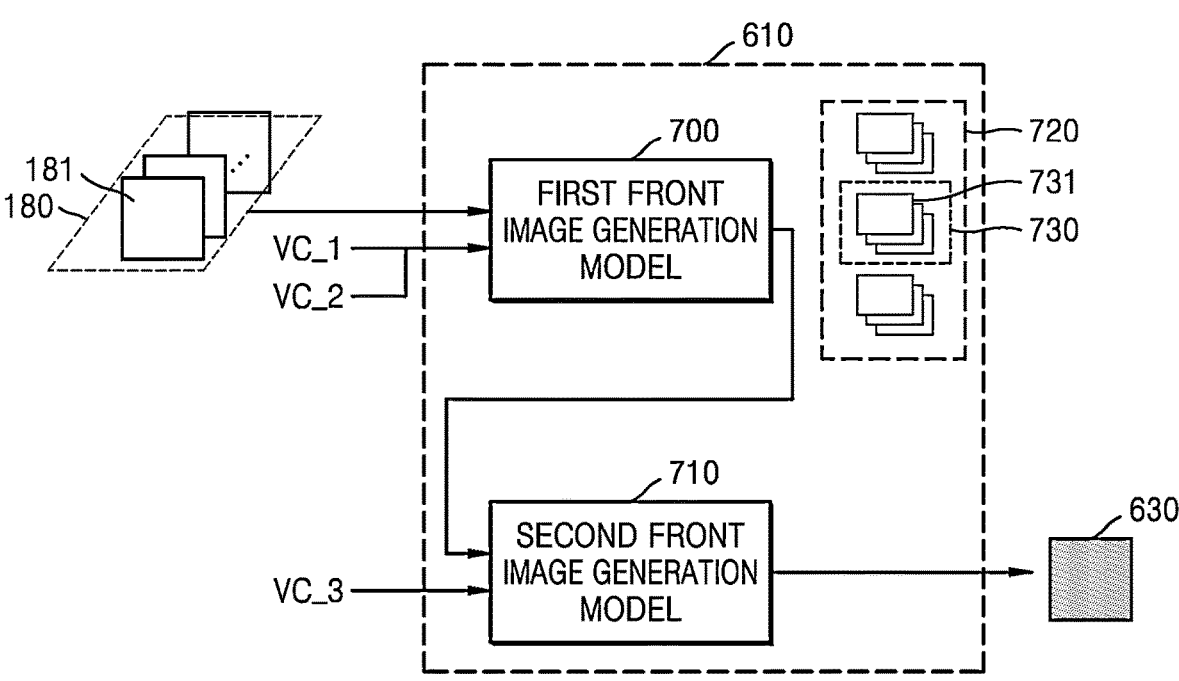
FIG. 7 is a diagram for describing a front image generation model according to an example embodiment.

FIG. 7 is a diagram for describing a front image generation model according to an example embodiment. Hereinafter, elements that are the same as those described with reference to FIGS. 5 and 6 are rendered the same reference numeral, and redundant explanations are omitted.

Referring to FIG. 7, in an embodiment, the front image generation model 610 may include a first front image generation model 700 and a second front image generation model 710. The first front image generation model 700 may be a model configured to generate an intermediate front image 720 that corresponds to an intermediate image that is the base image 620 that is subject to compensation by the front image 630, in which at least one piece of information of gamma, a color, a contrast ratio, luminance, or a gray is changed due to a difference between a viewing angle of the user 150 and the reference viewing angle, and that has passed through the optical layer 140.

The second front image generation model 710 may be a model configured to generate the front image 630 that may be combined with an intermediate image, based on the intermediate front image 720, the intermediate image being provided to the front panel 130 by passing through the base panel 120 and the optical layer 140.

Therefore, the front image generation model 610 may be a model configured to generate the front image 630, based on an intermediate image that is the base image 620 generated by the base image generation model 600 is provided to the user 150 after passing through the optical layer 140, at the viewing angle of the user 150, the front image 630 being for generating the image 160 in which gamma, a color, a contrast ratio, luminance, and a gray are constant, regardless of the viewing angle of the user 150.

In an embodiment, the first front image generation model 700 may include instructions or program code related to an operation or a function of generating the intermediate front image 720, based on view characteristic information of the base panel 120 according to the viewing angle of the user 150, by receiving the input image 180, the view characteristic information VC_1 of the base panel 120 which corresponds to the viewing angle of the user 150, and the characteristic information VC_2 of the optical layer 140.

In an embodiment, the first front image generation model 700 may include instructions or program code related to an operation or a function of generating the intermediate front image 720 corresponding to an intermediate image that is a base image provided to the user 150 after passing through the optical layer 140, the base image being generated by performing factorization on the input image 180, based on the view characteristic information VC_1 of the base panel 120 which corresponds to the viewing angle of the user 150, and the characteristic information VC_2 of the optical layer 140.

In an embodiment, the first front image generation model 700 may be a model configured to generate the intermediate front image 720 that corresponds to an intermediate image generated from the base image that passes through the optical layer 140 and to which the view characteristic information of the base panel 120 according to the viewing angle of the user 150 has been reflected, based on the view characteristic information VC_1 of the base panel 120 which corresponds to the viewing angle of the user 150, and the characteristic information VC_2 of the optical layer 140. In an embodiment, the intermediate front image 720 may be an image corresponding to the intermediate image that is from the base image having gamma, a color, a contrast ratio, luminance, and a gray according to the view characteristic information VC_1 of the base panel 120 which corresponds to the viewing angle of the user 150, that corresponds to a view of the user 150, and is provided to the user 150 via the optical layer 140. In this regard, the intermediate front image 720 may not be an image displayed after actually passing through the base panel 120 and the optical layer 140 of the electronic device 100 but may be an intermediate-level image generated by performing factorization on the input image 180 via the second front image generation model 710, the intermediate-level image being generated to provide the base characteristic information according to the viewing angle of the user 150 and the characteristic information of the optical layer which are subject to compensation via the front image 630.

In an embodiment, the first front image generation model 700 may be a model configured to generate a plurality of sub-intermediate front images viewed at a plurality of different views, based on a plurality of pieces of base characteristic information of the base panel 120 and the characteristic information VC_2 of the optical layer 140 which are provided. In an embodiment, when the at least one processor 230 provides, to the first front image generation model 700, the view characteristic information VC_1 of the base panel 120 which corresponds to the obtained viewing angle of the user 150 and the characteristic information VC_2 of the optical layer 140, a sub-intermediate front image 730 to which the view characteristic information VC_1 of the base panel 120 at a view corresponding to the viewing angle of the user 150 is reflected and which is among a plurality of sub-intermediate front images may be generated.

In an embodiment, each of the plurality of sub-intermediate front images may include a plurality of sub-view intermediate front images which are viewed at a corresponding view. Each of the plurality of sub-view intermediate front images may include an image 731 and images, the image 731 including a face of an object which is displayed to provide a three-dimensional effect to the user 150 at a corresponding view and the images including a face of the object which is displayed to provide a three-dimensional effect to the user 150 at a neighboring view. Even when an image provided at a view corresponding to a viewing angle of the user 150 and images provided at a neighboring view are provided to the user 150, the image 731 provided at the view corresponding to the viewing angle of the user 150 matches a focus of eyes of the user 150, and thus, the user 150 may experience a three-dimensional effect by viewing a face of the object which corresponds to the view. However, the present disclosure is not limited thereto, and the user 150 may receive only the image 731 provided at the view corresponding to the viewing angle of the user 150.

Hereinafter, for convenience of descriptions, the sub-intermediate front image 730 to which the view characteristic information VC_1 of the base panel 120 at the view corresponding to the viewing angle of the user 150 is reflected is referred to as the intermediate front image 720.

In an embodiment, the first front image generation model 700 may include a first artificial intelligence model trained to infer the intermediate front image 720, based on the input image 180, the view characteristic information VC_1 of the base panel 120 which corresponds to the viewing angle of the user 150, and the characteristic information VC_2 of the optical layer 140. In an embodiment, the first artificial intelligence model may be an artificial intelligence model trained to infer the intermediate front image 720 by performing factorization on the input image 180, based on the view characteristic information VC_1 of the base panel 120 which corresponds to the viewing angle of the user 150, and the characteristic information VC_2 of the optical layer 140. Hereinafter, a method of training the first artificial intelligence model will be described in detail below with reference to FIGS. 10, 11, and 15.

In an embodiment, the second front image generation model 710 may include instructions or program code related to an operation or a function of generating the front image 630, based on the intermediate front image 720 and the view characteristic information VC_3 of the front panel 130 which corresponds to the viewing angle of the user 150, the front image 630 corresponding to the viewing angle of the user 150 and displayed via the front panel 130.

In an embodiment, the second front image generation model 710 may include instructions or program code related to an operation or a function of generating the front image 630 to be combined with the intermediate front image 720 so as to provide the image 160, based on the intermediate front image 720 and the view characteristic information VC_3 of the front panel 130 which corresponds to the viewing angle of the user 150.

In an embodiment, the second front image generation model 710 may include instructions or program code related to an operation or a function of generating the front image 630 to be combined with the intermediate front image 720 provided to the front panel 130 so as to generate the image 160 having gamma, a color, a contrast ratio, luminance, and a gray which are constant. In an embodiment, the front image 630 may be an image for compensating for a difference between the reference base characteristic information and view characteristic information of the base image 630 refracted via the optical layer 140 and provided to the front panel 130 due to a difference between the viewing angle of the user 150 and the reference viewing angle, and a difference between the view characteristic information of the front image 630 and the reference front characteristic information due to the difference between the viewing angle of the user 150 and the reference viewing angle.

In an embodiment, the second front image generation model 710 may include a second artificial intelligence model trained to infer the front image 630, based on the intermediate front image 720 and the view characteristic information VC_3 of the front panel 130 which corresponds to the viewing angle of the user 150. In an embodiment, the second artificial intelligence model may be an artificial intelligence model trained to infer the front image 630 to be combined with the intermediate front image 720 so as to provide the image 160, based on the view characteristic information VC_3 of the front panel 130 which corresponds to the viewing angle of the user 150 and the intermediate front image 720. Hereinafter, a method of training the second artificial intelligence model will be described below with reference to FIGS. 12 to 15.

In an embodiment, referring to FIG. 7, the first front image generation model 700 and the second front image generation model 710 are separately illustrated, but the present disclosure is not limited thereto. The first front image generation model 700 and the second front image generation model 710 may be included in one model configured to perform factorization on the input image 180, based on the view characteristic information VC_1 of the base panel 120 which corresponds to the viewing angle of the user 150, the characteristic information VC_2 of the optical layer 140, and the view characteristic information VC_3 of the front panel 130 which corresponds to the viewing angle of the user 150, thereby generating a base image and the front image 630 for providing the image 160.

In an embodiment, the front image generation model 610 may include an artificial intelligence model trained to infer the intermediate front image 720 by performing factorization on the input image 180, based on the view characteristic information VC_1 of the base panel 120 which corresponds to the viewing angle of the user 150, and the characteristic information VC_2 of the optical layer 140, and to infer the front image 630 to be combined with the intermediate front image 720 so as to provide the image 160, based on the inferred intermediate front image 720 and the view characteristic information VC_3 of the front panel 130 which corresponds to the viewing angle of the user 150.

Figure 8:
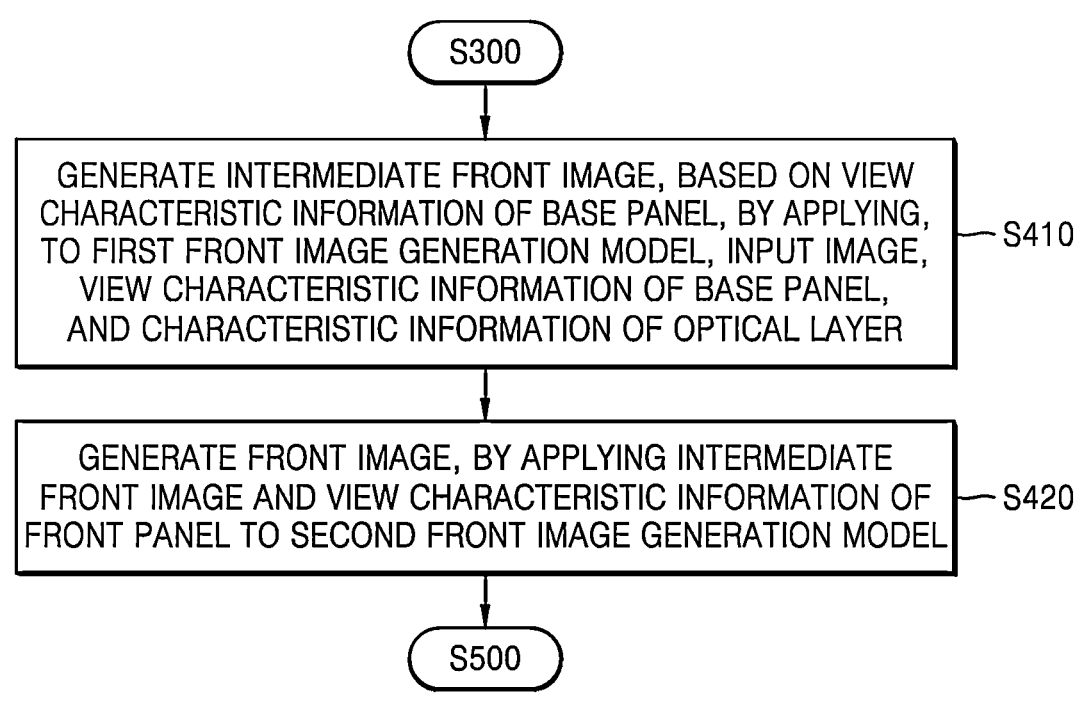
FIG. 8 is a flowchart for describing a front image generation model according to an example embodiment.

FIG. 8 is a flowchart for describing a front image generation model according to an example embodiment. Hereinafter, operations that are the same as those described with reference to FIG. 5 are rendered the same reference numeral, and redundant explanations are omitted.

Referring to FIGS. 7 and 8, in an embodiment, the generating of the front image 630 (S400) may include generating the intermediate front image 720, based on the view characteristic information VC_1 of the base panel 120, by applying, to the first front image generation model 700, the input image 180, the view characteristic information VC_1 of the base panel 120, and the characteristic information VC_2 of the optical layer 140 (S410). In an embodiment, in the generating of the intermediate front image 720 (S410), the at least one processor 230 may apply the input image 180, the view characteristic information VC_1 of the base panel 120, and the characteristic information VC_2 of the optical layer 140 to the first front image generation model 700, thereby generating the intermediate front image 720 corresponding to an intermediate image that is a base image having gamma, a color, a contrast ratio, luminance, and a gray according to the view characteristic information VC_1 of the base panel 120, corresponding to a view of the user 150, and provided to the user 150 via the optical layer 140.

In an embodiment, the generating of the front image 630 (S400) may include generating the front image 630 corresponding to the viewing angle of the user 150, by applying the intermediate front image 720 and the view characteristic information VC_3 of the front panel 130 to the second front image generation model 710 (S420). In an embodiment, in the generating of the front image 630 (S420), the at least one processor 230 may generate the front image 630 corresponding to the viewing angle of the user 150, by applying the intermediate front image 720 and the view characteristic information VC_3 of the front panel 130 which corresponds to the viewing angle of the user 150 to the second front image generation model 710.

In an embodiment, the front image 630 generated by the second front image generation model 710 in the generating of the front image 630 (S400) may be an image based on the difference between the view characteristic information of the base panel 120 which corresponds to the viewing angle of the user 150 and the reference base characteristic information and the difference between the view characteristic information of the front panel 130 and the reference front characteristic information, in correspondence to the viewing angle of the user 150. In an embodiment, the front image 630 may be an image to be combined with the base image 620 so as to generate the image 160, the base image 620 being compensated for the difference between the view characteristic information of the base panel 120 and the reference base characteristic information and the difference between the view characteristic information of the front panel 130 and the reference front characteristic information and having passed the optical layer 140. The front image 630 may be an image to be combined with the base image 620 provided to the front panel 130 via the optical layer 140 so as to provide the user 150 with the image 160 having gamma, a color, a contrast ratio, luminance, and a gray which are constant, regardless of the viewing angle of the user 150.

Therefore, in the providing of the image 160 to the user 150 (S500), the electronic device 100 may display, on the base panel 120, the base image 620 generated using the base image generation model 600, and may display, on the front panel 130, the front image 630 generated using the front image generation model 610. The electronic device 100 may obtain a viewing angle of the user 150 viewing the electronic device 100, may display the front image 630 corresponding to the obtained viewing angle on the front panel 130, and thus, may provide the user 150 with the image 160 in which an object included in the image 160 varies according to a change in a view corresponding to the viewing angle of the user 150 and gamma, a color, a contrast ratio, luminance, and a gray are constant, regardless of the change in the viewing angle of the user 150.

Figure 9:
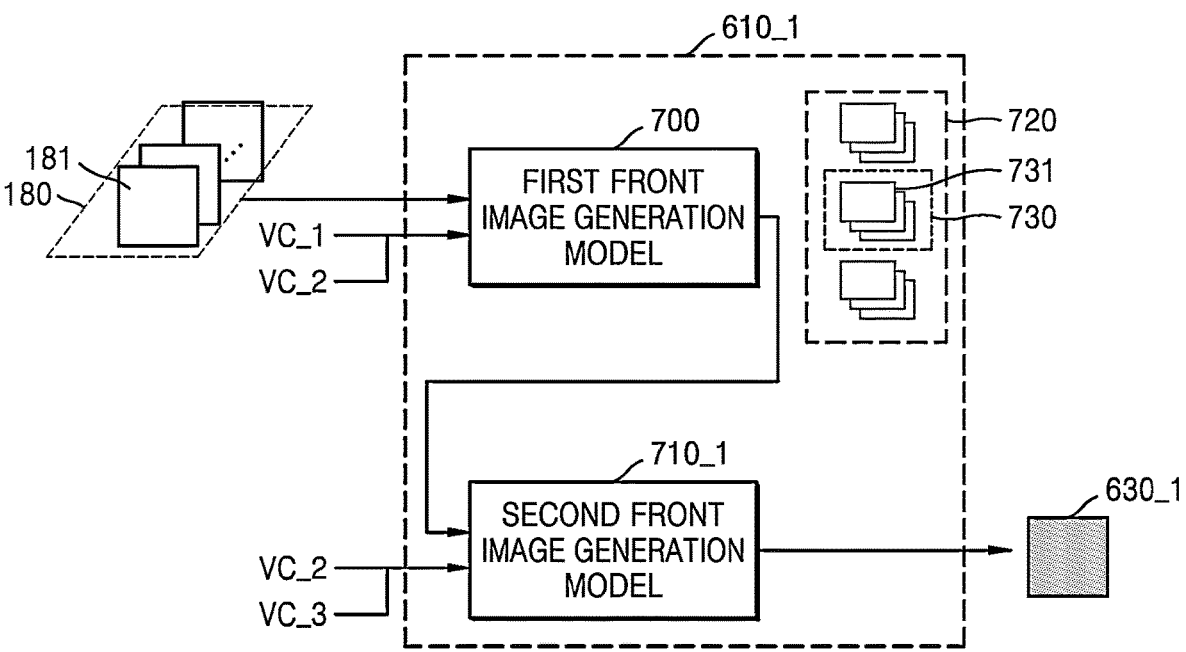
FIG. 9 is a diagram for describing a front image generation model according to an example embodiment.

FIG. 9 is a diagram for describing a front image generation model according to an example embodiment. Hereinafter, elements that are the same as those described with reference to FIG. 7 are rendered the same reference numeral, and redundant explanations are omitted.

Referring to FIG. 9, in an embodiment, the front image generation model 610 may include the first front image generation model 700 and a second front image generation model 710_1.

In an embodiment, the first front image generation model 700 may include instructions or program code related to an operation or a function of generating the intermediate front image 720 to which the view characteristic information VC_1 of the base panel 120 according to a viewing angle of the user 150 is reflected, based on the input image 180, the view characteristic information VC_1 of the base panel 120 which corresponds to the viewing angle of the user 150, and the characteristic information VC_2 of the optical layer 140.

In an embodiment, the second front image generation model 710_1 may include instructions or program code related to an operation or a function of generating a front image 630_1 corresponding to the viewing angle of the user 150, based on the intermediate front image 720, the view characteristic information VC_3 of the front panel 130, and the characteristic information VC_2 of the optical layer 140. In an embodiment, the at least one processor 230 may generate the front image 630_1 by applying, to the second front image generation model 710_1, the intermediate front image 720, the view characteristic information VC_3 of the front panel 130, and the characteristic information VC_2 of the optical layer 140.

In an embodiment, compared to the second front image generation model 710 shown in FIG. 7, the second front image generation model 710_1 shown in FIG. 9 may generate the front image 630_1 by receiving not only the intermediate front image 720 and the view characteristic information VC_3 of the front panel 130 but also receiving the characteristic information VC_2 of the optical layer 140.

In an embodiment, the intermediate front image 720 may be an image provided to the user 150 and corresponding to an intermediate image that is a base image to which the view characteristic information VC_1 of the base panel 120 according to the viewing angle of the user 150 has been reflected and that has passed through the optical layer 140. When the characteristic information VC_2 of the optical layer 140 is provided in generation of the front image 630_1, information about a base image to which the view characteristic information VC_1 of the base panel 120 has been reflected before refraction via the optical layer 140 may be obtained from the intermediate front image 720. Therefore, accuracy of compensation, via the front image 630_1, with respect to a difference between the view characteristic information VC_1 of the base panel 120 and the reference base characteristic information may be increased.

Figure 10:
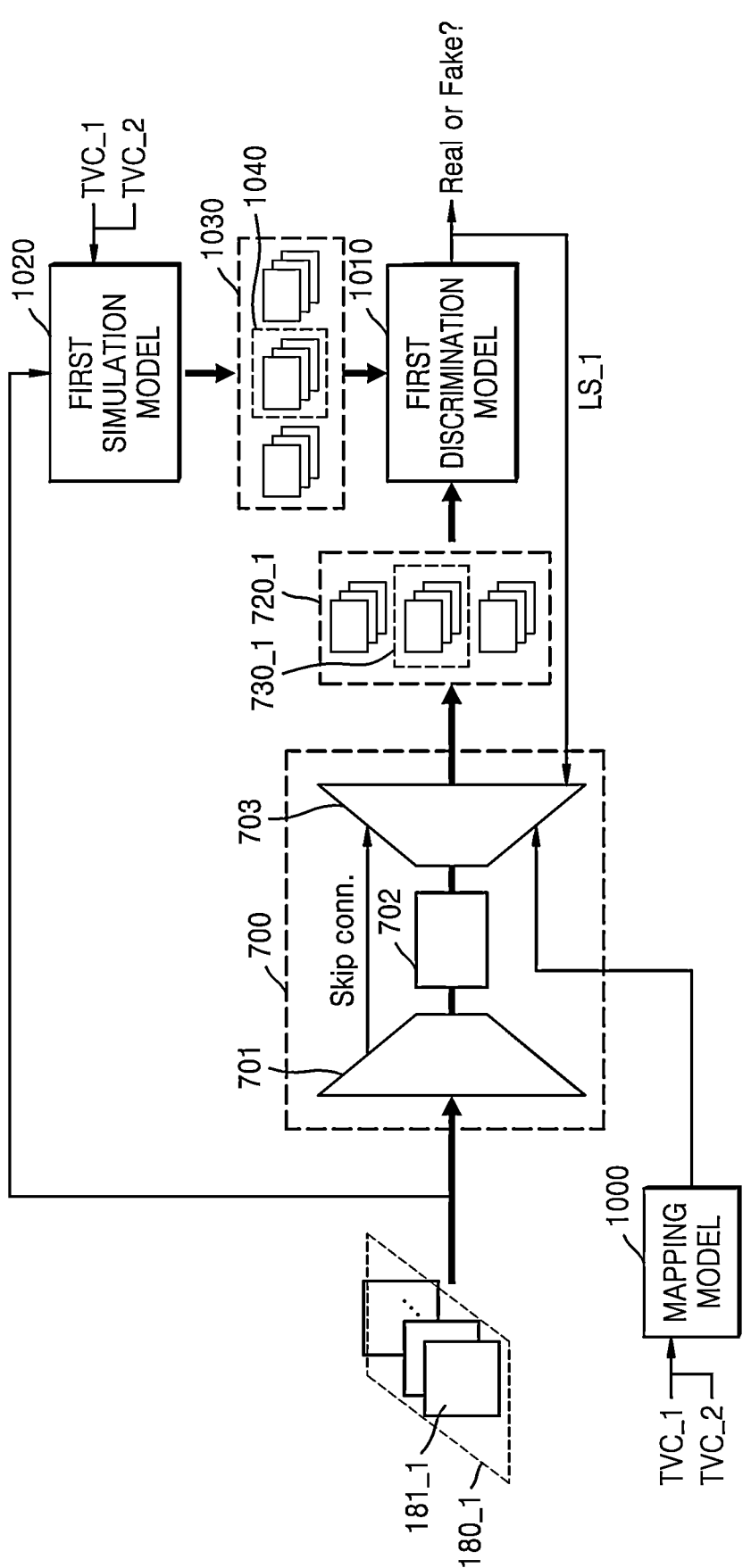
FIG. 10 is a diagram for describing a method of training a first artificial intelligence model included in a first front image generation model, according to an example embodiment.

FIG. 10 is a diagram for describing a method of training a first artificial intelligence model included in a first front image generation model, according to an example embodiment. FIG. 11 is a flowchart for describing the method of training a first artificial intelligence model included in a first front image generation model, according to an example embodiment. Hereinafter, elements that are the same as those described with reference to FIGS. 6 and 7 are rendered the same reference numeral, and redundant explanations are omitted.

Referring to FIGS. 3, 7, 10, and 11, the first front image generation model 700 may include a first artificial intelligence model 700 trained to infer the intermediate front image 720, based on the input image 180, the view characteristic information VC_1 of the base panel 120 which corresponds to the viewing angle of the user 150, and the characteristic information VC_2 of the optical layer 140.

In an embodiment, training of the first artificial intelligence model 700 may include generating an intermediate front image for training 720_1 by applying, to the first artificial intelligence model 700, an input image for training 180_1, view characteristic information for training TVC_1 of the base panel 120 which corresponds a viewing angle for training, and characteristic information for training TVC_2 of the optical layer 140.

In an embodiment, when the base panel 120 in the training of the first artificial intelligence model 700 and a viewing angle for training are equal to the base panel 120 included in the electronic device 100 and a viewing angle of the user 150, the view characteristic information for training TVC_1 of the base panel provided to the first artificial intelligence model 700 in the training may be equal to the view characteristic information VC_1 of the base panel 120 included in the electronic device 100. In an embodiment, when the optical layer 140 in the training of the first artificial intelligence model 700 is equal to the optical layer 140 included in the electronic device 100, the characteristic information for training TVC_2 of the optical layer 140 provided to the first artificial intelligence model 700 in the training may be equal to the characteristic information VC_2 of the optical layer 140 included in the electronic device 100.

Hereinafter, it is described that the base panel 120, the optical layer 140, and the front panel 130 in the training of the first artificial intelligence model 700 and a second artificial intelligence model 710 are respectively equal to the base panel, the optical layer, and the front panel included in the electronic device 100.

In an embodiment, the input image for training 180_1 may include a plurality of training view images 181_1 obtained by photographing an object at a plurality of different views.

In an embodiment, the first artificial intelligence model 700 may be a model configured to generate the intermediate front image for training 720_1 by receiving the input image for training 180_1, the view characteristic information for training TVC_1 of the base panel 120, and the characteristic information for training TVC_2 of the optical layer 140. In an embodiment, the first artificial intelligence model 700 may be the model configured to generate the intermediate front image for training 720_1 that is a base image generated by performing factorization on the input image for training 180_1 is displayed on the base panel 120 and then is displayed, via the optical layer 140, with gamma, a color, a contrast ratio, luminance, and a gray which correspond to a viewing angle for training, based on the view characteristic information for training TVC_1 of the base panel 120 and the characteristic information for training TVC_2 of the optical layer 140.

In an embodiment, the first artificial intelligence model 700 may include a first encoder 701 and a first decoder 703. In an embodiment, the first encoder 701 may compress a dimension of a feature vector included in the input image for training 180_1 by encoding the input image for training 180_1, may extract a feature included in the input image for training 180_1, and thus, may generate a latent vector 702. In an embodiment, the first encoder 701 may encode the input image for training 180_1 by performing convolution. In an embodiment, a size of a filter and a weight included in the filter used for the first encoder 701 to perform convolution may vary according to a feature to be extracted from the input image for training 180_1. The first encoder 701 may include a convolution layer for performing at least one convolution and at least one pooling layer. However, the present disclosure is not limited thereto, and the first artificial intelligence model 700 may include at least one fully connected layer and may extract a feature included in the input image for training 180_1 via the at least one fully connected layer.

In an embodiment, the first decoder 703 may decode the latent vector 702 generated by the first encoder 701, and thus, may generate the intermediate front image for training 720_1. The first decoder 703 may include the same layer structure as a layer structure included in the first encoder 701. In an embodiment, the first decoder 703 may restore the dimension of the latent vector 702, and may generate the intermediate front image for training 720_1, based on the feature included in the latent vector 702. In an embodiment, the first decoder 703 may perform deconvolution, and thus, may generate the intermediate front image for training 720_1, based on the latent vector 702.

In an embodiment, when the first decoder 703 generates the intermediate front image for training 720_1 by decoding the latent vector 702, a condition of the view characteristic information for training TVC_1 of the base panel 120 which corresponds the viewing angle for training, and the characteristic information for training TVC_2 of the optical layer 140 may be provided to the first decoder 703. The first decoder 703 may generate the intermediate front image for training 720_1 to which the view characteristic information for training TVC_1 of the base panel 120 and the characteristic information for training TVC_2 of the optical layer 140 provided as the condition are reflected.

In an embodiment, the view characteristic information for training TVC_1 of the base panel 120 and the characteristic information for training TVC_2 of the optical layer 140 may be provided to the first decoder 703 via a first mapping model 1000. In an embodiment, the first mapping model 1000 may map, via encoding, the view characteristic information for training TVC_1 of the base panel 120 and the characteristic information for training TVC_2 of the optical layer 140, and may provide a mapping result as the condition to a layer included in the first decoder 703. However, the present disclosure is not limited thereto, and the first mapping model 1000 may include a DNN structure.

Referring to FIG. 10, it is illustrated that the view characteristic information for training TVC_1 of the base panel 120 and the characteristic information for training TVC_2 of the optical layer 140 are provided to the first decoder 703 via the first mapping model 1000, but the present disclosure is not limited thereto. The view characteristic information for training TVC_1 of the base panel 120 and the characteristic information for training TVC_2 of the optical layer 140 may be provided to the first encoder 701 or may be provided to both the first encoder 701 and the first decoder 703, and may be mapped, via the first mapping model 1000, to match a dimension of a provided layer.

In an embodiment, the first artificial intelligence model 700 may include skip connection for connecting the first encoder 701 to the first decoder 703. Information of the input image for training 180_1 may be provided to the first decoder 703 via the skip connection.

In an embodiment, the intermediate front image for training 720_1 may be an image corresponding to a training intermediate image that is a base image that has gamma, a color, a contrast ratio, luminance, and a gray according to the view characteristic information for training TVC_1 of the base panel 120 which corresponds to a viewing angle for training, that corresponds to a view corresponding to the viewing angle for training, and that is provided via the optical layer 140.

In an embodiment, the first artificial intelligence model 700 may generate a plurality of sub-intermediate front images for training that are viewed at a plurality of different views for training, based on a plurality of pieces of provided characteristic information for training of the base panel 120 and the characteristic information for training TVC_2 of the optical layer 140. In an embodiment, when the view characteristic information for training TVC_1 of the base panel 120 which corresponds the viewing angle for training and the characteristic information for training TVC_2 of the optical layer 140 are provided to the first artificial intelligence model 700, a sub-intermediate front image 730_1 that is among the plurality of sub-intermediate front images for training and to which the view characteristic information for training TVC_1 of the base panel 120 at a view corresponding to the viewing angle for training is reflected may be generated. Hereinafter, for convenience of descriptions, the sub-intermediate front image 730_1 to which the view characteristic information for training TVC_1 of the base panel 120 at the view corresponding to the viewing angle for training is reflected is referred to as the intermediate front image for training 720_1.

In an embodiment, the training of the first artificial intelligence model may include generating a reference intermediate front image 1030 based on the view characteristic information for training TVC_1 of the base panel 120 by applying the input image for training 180_1, the view characteristic information for training TVC_1 of the base panel 120, and the characteristic information for training TVC_2 of the optical layer 140 to a first simulation model 1020 (S1120).

In an embodiment, the first simulation model 1020 may calculate a base image to be displayed on the base panel 120 so as to display an image with a three-dimensional effect, by performing simulation based on the input image for training 180_1, and may generate the reference intermediate front image 1030 that is the calculated base image refracted via the optical layer 140 and viewed at the viewing angle for training, according to the view characteristic information for training TVC_1 of the base panel 120 and the characteristic information for training TVC_2 of the optical layer 140. In an embodiment, the first simulation model 1020 may calculate a model of the base panel 120 having the view characteristic information for training TVC_1 and a model of the optical layer 140 having the characteristic information for training TVC_2, and may perform simulation for generating the reference intermediate front image 1030, based on the calculated model of the base panel 120 and the calculated model of the optical layer 140.

In an embodiment, the first simulation model 1020 may generate a plurality of sub-reference intermediate front images corresponding to the calculated base image that is viewed at a plurality of different views for training after being refracted via the optical layer 140, according to the plurality of pieces of provided characteristic information for training of the base panel 120 and the characteristic information for training TVC_2 of the optical layer 140. In an embodiment, when the view characteristic information for training TVC_1 of the base panel 120 which corresponds to the viewing angle for training, and the characteristic information for training TVC_2 of the optical layer 140 are provided to the first simulation model 1020, a sub-reference intermediate front image 1040 that is among the plurality of sub-reference intermediate front images and is viewed at a view corresponding to the viewing angle for training may be generated via simulation. Hereinafter, for convenience of descriptions, the sub-reference intermediate front image 1040 viewed at the view corresponding to the viewing angle for training is referred to as the reference intermediate front image 1030.

In an embodiment, the training of the first artificial intelligence model may include training the first artificial intelligence model 700, based on a first loss function LS_1 according to a difference between the intermediate front image for training 720_1 and the reference intermediate front image 1030 (S1130).

In an embodiment, a first discrimination model 1010 receives the intermediate front image for training 720_1 and the reference intermediate front image 1030. The first discrimination model 1010 may discriminate the intermediate front image for training 720_1, based on the reference intermediate front image 1030 as being a ground truth. The first discrimination model 1010 may discriminate the intermediate front image for training 720_1 as real when the intermediate front image for training 720_1 is recognized as the reference intermediate front image 1030, and may output a result value of "1". When the intermediate front image for training 720_1 is not recognized as the reference intermediate front image 1030, the first discrimination model 1010 may discriminate the intermediate front image for training 720_1 as false, and may output a result value of "0".

In an embodiment, the first loss function LS_1 may include a function for training the first discrimination model 1010 to output a result value of "0" with respect to the intermediate front image for training 720_1. The first discrimination model 1010 may be trained to output, via the first loss function LS_1, a result value of "0" with respect to the intermediate front image for training 720_1 which is different from a real value.

In an embodiment, the first artificial intelligence model 700 may be trained to output a result value of "1" from the first discrimination model 1010 when the intermediate front image for training 720_1 is recognized as the reference intermediate front image 1030 by the first discrimination model 1010.

In an embodiment, the first loss function LS_1 may include a function for training the first artificial intelligence model 700 to generate the intermediate front image for training 720_1 to be recognized as the reference intermediate front image 1030 by the first discrimination model 1010 so as to output a result value of "1". The first artificial intelligence model 700 may be trained, by the first loss function LS_1, to generate the intermediate front image for training 720_1 that is similar to the reference intermediate front image 1030 that is a real value.

In an embodiment, by the first loss function LS_1, the first discrimination model 1010 may be trained to discriminate the reference intermediate front image 1030 and the intermediate front image for training 720_1 as different images, and the first artificial intelligence model 700 may be trained to generate the intermediate front image for training 720_1 not to be distinguished from the reference intermediate front image 1030. Accordingly, the first artificial intelligence model 700 may be trained to infer the intermediate front image for training 720_1 based on the view characteristic information for training TVC_1 of the base panel 120, which is a base image viewed via the optical layer 140 at a view for training corresponding to the viewing angle for training.

Figure 12:
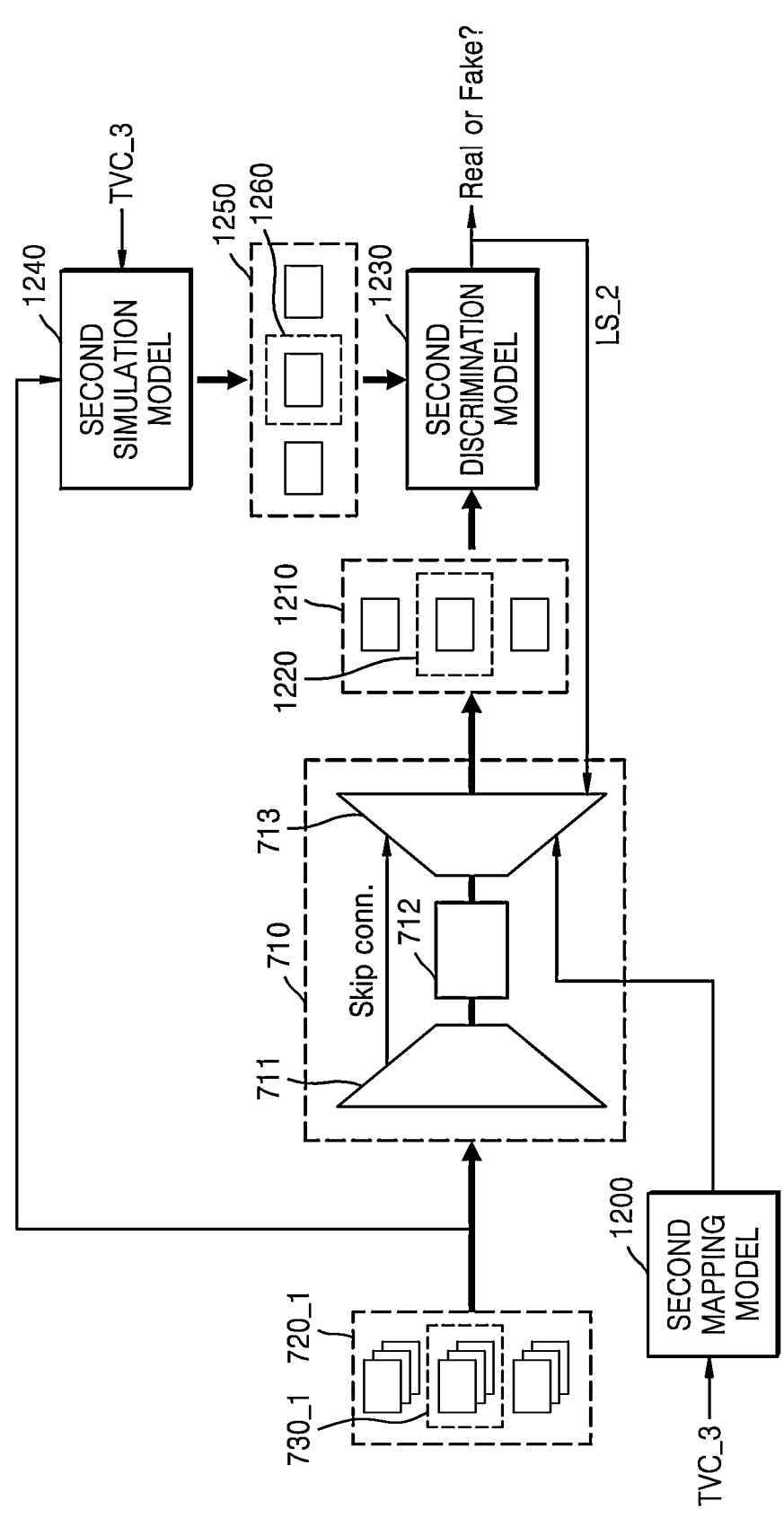
FIG. 12 is a diagram for describing a method of training a second artificial intelligence model included in a second front image generation model, according to an example embodiment.
Figure 13:
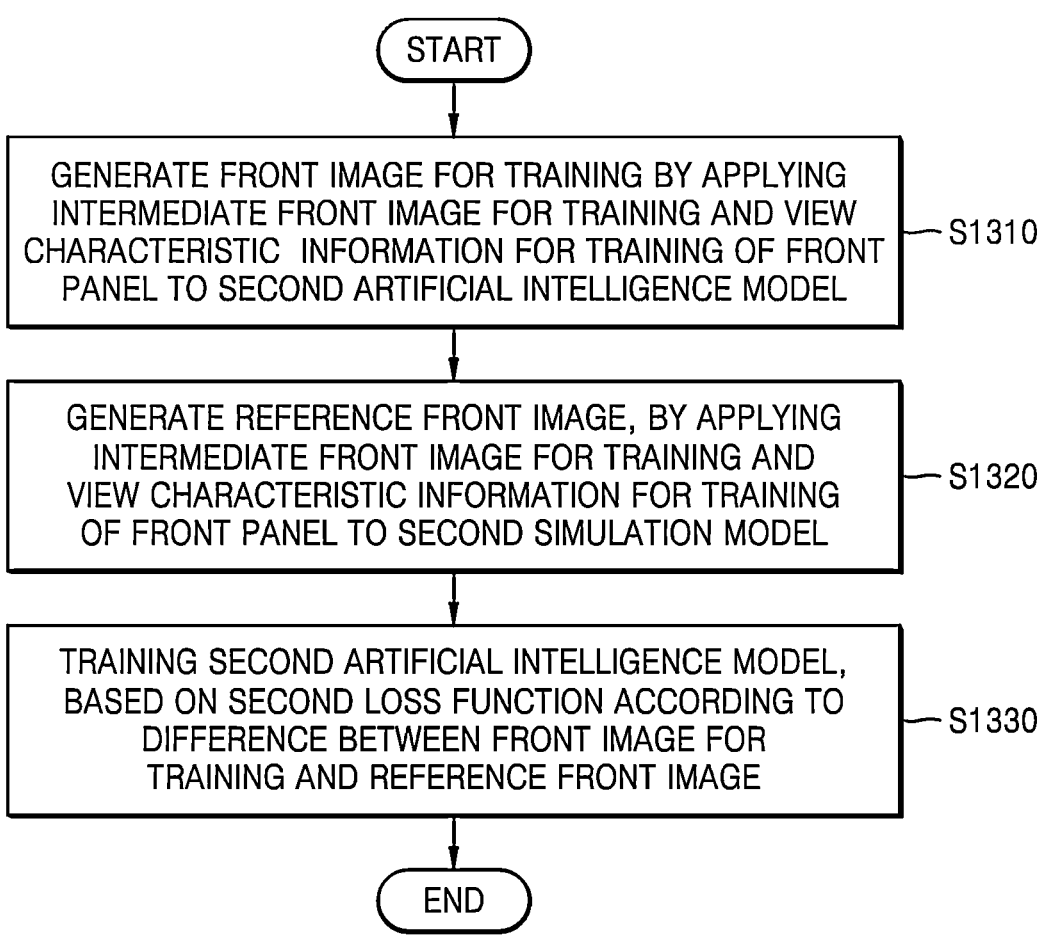
FIG. 13 is a flowchart for describing the method of training a second artificial intelligence model included in a second front image generation model, according to an example embodiment.

FIG. 12 is a diagram for describing a method of training a second artificial intelligence model included in a second front image generation model, according to an example embodiment. FIG. 13 is a flowchart for describing the method of training a second artificial intelligence model included in a second front image generation model, according to an example embodiment. Hereinafter, elements that are the same as those described with reference to FIGS. 10 and 11 are rendered the same reference numeral, and redundant explanations are omitted.

Referring to FIGS. 3, 7, 12, and 13, the second front image generation model 710 may include the second artificial intelligence model 710 trained to infer the front image 630, based on the intermediate front image 720 and the view characteristic information VC_3 of the front panel 130 which corresponds to the viewing angle of the user 150.

In an embodiment, training of the second artificial intelligence model 710 may include generating a front image for training 1210 by applying the intermediate front image for training 720_1 and view characteristic information for training TVC_3 of the front panel 130 which corresponds to a viewing angle for training to the second artificial intelligence model 710 (S1310).

In an embodiment, the second artificial intelligence model 710 may be a model configured to generate the front image for training 1210 by receiving the intermediate front image for training 720_1 and the view characteristic information for training TVC_3 of the front panel 130 which corresponds to the viewing angle for training. In an embodiment, the second artificial intelligence model 710 may be a model configured to generate the front image for training 1210, based on a difference between the view characteristic information for training TVC_1 of the base panel 120 and the reference base characteristic information and a difference between the view characteristic information for training TVC_3 of the front panel 130 and the reference front characteristic information. The electronic device 100 may provide, at a viewing angle for training, an image having the same gamma, color, contrast ratio, luminance, and gray as gamma, a color, a contrast ratio, luminance, and a gray of an image viewable at a reference viewing angle, via a combination of the front image for training 1210 and the intermediate front image for training 720_1.

In an embodiment, the second artificial intelligence model 710 may include a second encoder 711 and a second decoder 713. In an embodiment, the second encoder 711 may extract a feature included in the intermediate front image for training 720_1 by encoding the intermediate front image for training 720_1, and thus, may generate a latent vector 712. Referring to FIG. 12, the intermediate front image for training 720_1 is provided to the second encoder 711, but the present disclosure is not limited thereto. In an embodiment, the intermediate front image for training 720_1 and the input image for training 180_1 may be provided to the second encoder 711, and the second encoder 711 may encode the intermediate front image for training 720_1 and the input image for training 180_1, thereby generating the latent vector.

In an embodiment, the second decoder 713 may generate the front image for training 1210 by decoding the latent vector 712 generated via the second encoder 711. The second decoder 713 may include the same layer structure as the first encoder 701. The second decoder 713 may restore a dimension of the latent vector 712, and may generate the front image for training 1210, based on the feature included in the latent vector 712.

In an embodiment, when the second decoder 713 generates the front image for training 1210 by decoding the latent vector 712, a condition of the view characteristic information for training TVC_3 of the front panel 130 which corresponds to the viewing angle for training may be provided to the second decoder 713. The second decoder 713 may generate the front image for training 1210 to which the view characteristic information for training TVC_3 of the front panel 130 provided as the condition is reflected.

In an embodiment, the view characteristic information for training TVC_3 of the front panel 130 may be provided to the second decoder 713 via a second mapping model 1200. In an embodiment, the second mapping model 1200 may map, via encoding, the view characteristic information for training TVC_3 of the front panel 130, and may provide a mapping result as the condition to a layer included in second decoder 713. However, the present disclosure is not limited thereto, and the second mapping model 1200 may include a DNN structure.

Referring to FIG. 12, it is illustrated that the view characteristic information for training TVC_3 of the front panel 130 is provided to the second decoder 713 via the second mapping model 1200, but the present disclosure is not limited thereto. The view characteristic information for training TVC_3 of the front panel 130 may be provided to the second encoder 711 or may be provided to both the second encoder 711 and the second decoder 713, and may be mapped, via the second mapping model 1200, to match a dimension of a provided layer.

In an embodiment, the second artificial intelligence model 710 may include skip connection for connecting the second encoder 711 to the second decoder 713. Information of the intermediate front image for training 720_1 may be provided to the second decoder 713 via the skip connection.

In an embodiment, the front image for training 1210 may be an image for compensating for a difference between the reference base characteristic information and the view characteristic information for training TVC_1 of the base panel 120 of the intermediate front image for training 720_1 refracted via the optical layer 140 and provided to the front panel 130 and a difference between the reference front characteristic information and the view characteristic information for training TVC_3 of the front panel 130, due to a difference between the viewing angle for training and the reference viewing angle.

In an embodiment, the second artificial intelligence model 710 may generate a plurality of sub-front images for training viewed at a plurality of different views for training, based on a plurality of pieces of provided characteristic information for training of the front panel 130. In an embodiment, when the view characteristic information for training TVC_3 of the front panel 130 which corresponds to the viewing angle for training is provided to the second artificial intelligence model 710, a sub-front image for training 1220 that is among the plurality of sub-front images for training and to which the view characteristic information for training TVC_3 of the front panel 130 at a view corresponding to the viewing angle for training is reflected may be generated. Hereinafter, for convenience of descriptions, the sub-front image for training 1220 to which the view characteristic information for training TVC_3 of the front panel 130 at the view corresponding to the viewing angle for training is reflected is referred to as the front image for training 1210.

In an embodiment, the training of the second artificial intelligence model 710 may include generating a reference front image 1250 based on the difference between the view characteristic information for training TVC_1 of the base panel 120 and the reference base characteristic information and the difference between the view characteristic information for training TVC_3 of the front panel 130 and reference front characteristic information, by applying the intermediate front image for training 720_1 and the view characteristic information for training TVC_3 of the front panel 130 to a second simulation model 1240 (S1320).

In an embodiment, the second simulation model 1240 may perform simulation based on the intermediate front image for training 720_1 and the view characteristic information for training TVC_3 of the front panel 130, and thus, may generate the reference front image 1250 capable of compensating for the difference between the view characteristic information for training TVC_1 of the base panel 120 and the reference base characteristic information and the difference between the view characteristic information for training TVC_3 of the front panel 130 and the reference front characteristic information, due to the difference between the viewing angle for training and the reference viewing angle, and being combined with the intermediate front image for training 720_1 so as to provide an image at a view corresponding to the viewing angle for training. In an embodiment, the second simulation model 1240 may perform simulation for generating the reference front image 1250 by calculating a model of the front panel 130 having the view characteristic information for training TVC_3 and applying the intermediate front image for training 720_1 to the calculated model of the front panel 130.

In an embodiment, the second simulation model 1240 may generate a plurality of sub-reference front images corresponding to the plurality of different views for training, according to the plurality of pieces of provided characteristic information for training of the front panel 130. In an embodiment, when the view characteristic information for training TVC_3 of the front panel 130 which corresponds to the viewing angle for training is provided to the second simulation model 1240, a sub-reference front image 1260 that is among the plurality of sub-reference front images and is viewed at a view corresponding to the viewing angle for training may be generated via simulation. Hereinafter, for convenience of descriptions, the sub-reference front image 1260 viewed at the view corresponding to the viewing angle for training is referred to as the reference front image 1250.

In an embodiment, the training of the second artificial intelligence model 710 may include training the second artificial intelligence model 710 to infer the front image for training 1210 based on the difference between the view characteristic information for training TVC_1 of the base panel 120 and the reference base characteristic information and the difference between the view characteristic information for training TVC_3 of the front panel 130 and the reference front characteristic information, based on a second loss function LS_2 according to a difference between the front image for training 1210 and the reference front image 1250 (S1330).

In an embodiment, a second discrimination model 1230 receives the front image for training 1210 and the reference front image 1250. The second discrimination model 1230 may discriminate the front image for training 1210, based on the reference front image 1250 as being a ground truth. The second discrimination model 1230 may discriminate the front image for training 1210 as real when the front image for training 1210 is recognized as the reference front image 1250, and may output a result value of "1". When the front image for training 1210 is not recognized as the reference front image 1250, the second discrimination model 1230 may discriminate the front image for training 1210 as false, and may output a result value of "0".

In an embodiment, the second loss function LS_2 may include a function for training the second discrimination model 1230 to output a result value of "0" with respect to the front image for training 1210. The second discrimination model 1230 may be trained to output, via the second loss function LS_2, a result value of "0" with respect to the front image for training 1210 which is different from a real value.

In an embodiment, the second artificial intelligence model 710 may be trained to output a result value of "1" from the second discrimination model 1230 when the front image for training 1210 is recognized as the reference front image 1250 by the second discrimination model 1230.

In an embodiment, the second loss function LS_2 may include a function for training the second artificial intelligence model 710 to generate the front image for training 1210 to be recognized as the reference front image 1250 by the second discrimination model 1230 so as to output a result value of "1". The second artificial intelligence model 710 may be trained, by the second loss function LS_2, to generate the front image for training 1210 that is similar to the reference front image 1250 that is a real value.

In an embodiment, by the second loss function LS_2, the second discrimination model 1230 may be trained to discriminate the reference front image 1250 and the front image for training 1210 as different images, and the second artificial intelligence model 710 may be trained to generate the front image for training 1210 not to be distinguished from the reference front image 1250. Accordingly, the second artificial intelligence model 710 may be trained to infer the front image for training 1210 that is an image that displays an object corresponding to a view for training and compensates for the difference between the view characteristic information for training TVC_1 of the base panel 120 and the reference base characteristic information and the difference between the view characteristic information for training TVC_3 of the front panel 130 and the reference front characteristic information of the intermediate front image for training 720_1.

Figure 14:
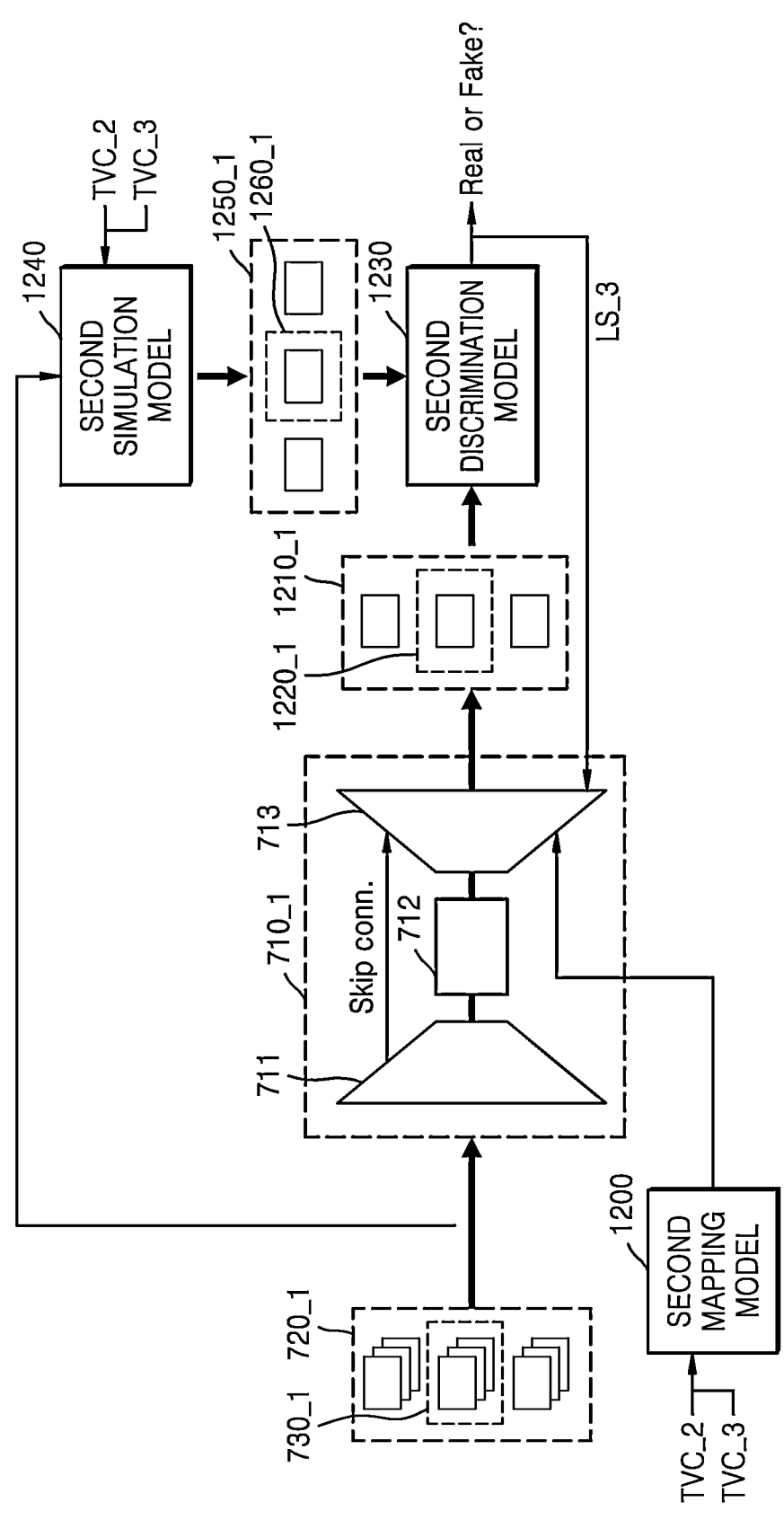
FIG. 14 is a diagram for describing a method of training a second artificial intelligence model included in a second front image generation model, according to an example embodiment.

FIG. 14 is a diagram for describing a method of training a second artificial intelligence model included in a second front image generation model, according to an example embodiment. Hereinafter, elements that are the same as those described with reference to FIG. 12 are rendered the same reference numeral, and redundant explanations are omitted.

Referring to FIGS. 3, 9 and 14, the second front image generation model 710_1 may include a second artificial intelligence model 710_1 trained to infer the front image 630_1, based on the intermediate front image 720, the view characteristic information VC_3 of the front panel 130 which corresponds to the viewing angle of the user 150, and the characteristic information VC_2 of the optical layer 140.

In an embodiment, the second artificial intelligence model 710_1 may be a model configured to generate a front image for training 1210_1 by receiving the intermediate front image for training 720_1, the view characteristic information for training TVC_3 of the front panel 130 which corresponds to the viewing angle for training, and the characteristic information for training TVC_2 of the optical layer 140.

In an embodiment, the second artificial intelligence model 710_1 may include the second encoder 711 and the second decoder 713 In an embodiment, the second encoder 711 may extract a feature included in the intermediate front image for training 720_1 by encoding the intermediate front image for training 720_1, and thus, may generate the latent vector 712

In an embodiment, the second decoder 713 may generate the front image for training 1210_1 by decoding the latent vector 712 generated via the second encoder 711.

In an embodiment, when the second decoder 713 generates the front image for training 1210_1 by decoding the latent vector 712, a condition of the view characteristic information for training TVC_3 of the front panel 130 which corresponds to the viewing angle for training and the characteristic information for training TVC_2 of the optical layer 140 may be provided to the second decoder 713. The second decoder 713 may generate the front image for training 1210_1 to which the view characteristic information for training TVC_3 of the front panel 130 and the characteristic information for training TVC_2 of the optical layer 140 provided as the condition are reflected.

In an embodiment, the view characteristic information for training TVC_3 of the front panel 130 and the characteristic information for training TVC_2 of the optical layer 140 may be provided to the second decoder 713 via the second mapping model 1200. In an embodiment, the second mapping model 1200 may map, via encoding, the view characteristic information for training TVC_3 of the front panel 130 and the characteristic information for training TVC_2 of the optical layer 140, and may provide a mapping result as the condition to the layer included in the second decoder 713.

Referring to FIG. 14, it is illustrated that the view characteristic information for training TVC_3 of the front panel 130 and the characteristic information for training TVC_2 of the optical layer 140 are provided to the second decoder 713 via the second mapping model 1200, but the present disclosure is not limited thereto. The view characteristic information for training TVC_3 of the front panel 130 and the characteristic information for training TVC_2 of the optical layer 140 may be provided to the second encoder 711 or may be provided to both the second encoder 711 and the second decoder 713, and may be mapped, via the second mapping model 1200, to match a dimension of a provided layer.

In an embodiment, the front image for training 1210_1 may be an image for compensating for the difference between the reference base characteristic information and the view characteristic information for training TVC_1 of the base panel 120 of the intermediate front image for training 720_1 refracted via the optical layer 140 and provided to the front panel 130 and the difference between the reference front characteristic information and the view characteristic information for training TVC_3 of the front panel 130, due to the difference between the viewing angle for training and the reference viewing angle. When the characteristic information for training TVC_2 of the optical layer 140 is provided, information about a base image for training to which the view characteristic information for training TVC_1 of the base panel 120 before refraction via the optical layer 140 is reflected may be obtained. Therefore, accuracy of compensation via the front image for training 1210_1 generated via the second artificial intelligence model 710_1, the compensation being with respect to the difference between the view characteristic information for training TVC_1 of the base panel 120 and the reference base characteristic information, may be increased.

In an embodiment, the second simulation model 1240 may perform simulation based on the intermediate front image for training 720_1, the view characteristic information for training TVC_3 of the front panel 130, and the characteristic information for training TVC_2 of the optical layer 140, and thus, may generate a reference front image 1250_1 capable of compensating for the difference between the view characteristic information for training TVC_1 of the base panel 120 and the reference base characteristic information and the difference between the view characteristic information for training TVC_3 of the front panel 130 and the reference front characteristic information, due to the difference between the viewing angle for training and the reference viewing angle, and being combined with the intermediate front image for training 720_1 so as to provide an image at a view corresponding to the viewing angle for training. In an embodiment, when the second simulation model 1240 receives the characteristic information for training TVC_2 of the optical layer 140, simulation may be performed by clarifying a difference between the reference base characteristic information and the view characteristic information for training TVC_1 of the base panel 120 of the base image for training before passing through the optical layer 140.

In an embodiment, a third loss function LS_3 may include a function for training the second front image generation model 710_1 to generate the front image for training 1210_1 to be recognized as the reference front image 1250_1 by the second discrimination model 1230 so as to output a result value of "1". The second front image generation model 710_1 may be trained to generate, by the third loss function LS_3, the front image for training 1210_1 being similar to the reference front image 1250_1.

In an embodiment, by the third loss function LS_3, the second discrimination model 1230 may be trained to discriminate the reference front image 1250_1 and the front image for training 1210_1 as different images, and the second artificial intelligence model 710_1 may be trained to generate the front image for training 1210_1 not to be distinguished from the reference front image 1250_1. Accordingly, the second artificial intelligence model 710_1 may be trained to infer the front image for training 1210_1 that is an image that displays an object corresponding to a view for training and compensates for the difference between the view characteristic information for training TVC_1 of the base panel 120 and the reference base characteristic information and the difference between the view characteristic information for training TVC_3 of the front panel 130 and the reference front characteristic information of the intermediate front image for training 720_1.

Figure 15:
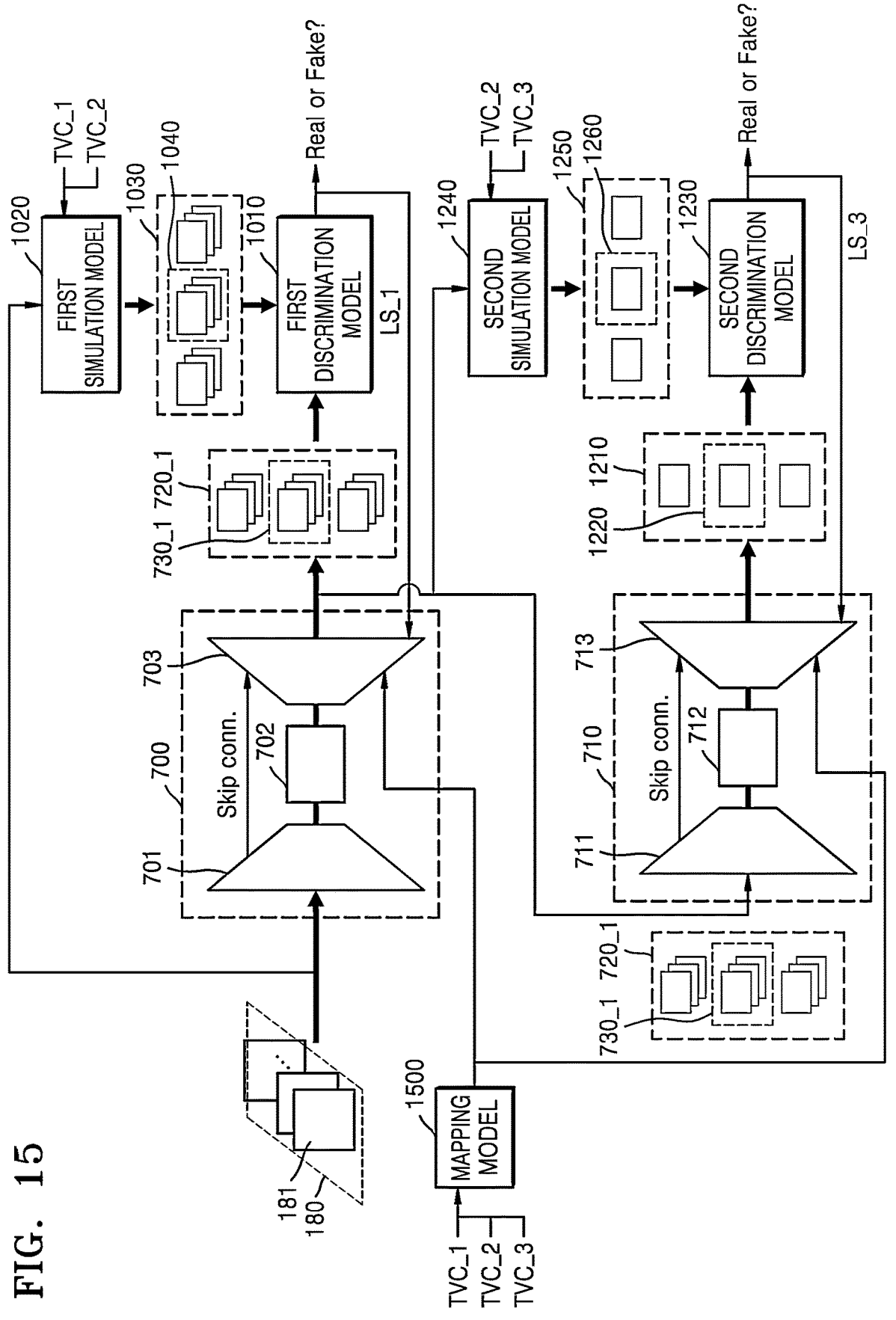
FIG. 15 is a diagram for describing a method of training a first artificial intelligence model included in a first front image generation model and a second artificial intelligence model included in a second front image generation model, according to an example embodiment.

FIG. 15 is a diagram for describing a method of training the first artificial intelligence model included in the first front image generation model and the second artificial intelligence model included in the second front image generation model, according to an example embodiment. Hereinafter, elements that are the same as those described with reference to FIGS. 10 and 12 are rendered the same reference numeral, and redundant explanations are omitted.

Referring to FIGS. 2, 7, and 15, the first artificial intelligence model 700 included in the first front image generation model 700 and the second artificial intelligence model 710 included in the second front image generation model 710 may be sequentially trained to infer the front image for training 1210 corresponding to any one viewing angle for training among a plurality of different viewing angles.

In an embodiment, the electronic device 100 may generate the intermediate front image for training 720_1 by applying, to the first front image generation model 700 via a mapping model 1500, the input image for training 180_1, the view characteristic information for training TVC_1 of the base panel 120, and the characteristic information for training TVC_2 of the optical layer 140.

In an embodiment, the electronic device 100 may generate the reference intermediate front image 1030 by applying, to the first simulation model 1020, the view characteristic information for training TVC_1 of the base panel 120 and the characteristic information for training TVC_2 of the optical layer 140.

In an embodiment, the electronic device 100 may calculate the first loss function LS_1 by applying the intermediate front image for training 720_1 and the reference intermediate front image 1030 to the first discrimination model 1010, and may train the first discrimination model 1010 and the first front image generation model 700, based on the first loss function LS_1. In an embodiment, the first front image generation model 700 may be trained to infer the intermediate front image for training 720_1 corresponding to an image that is a base image generated by performing factorization on the input image for training 180_1 is displayed on the base panel 120, has gamma, a color, a contrast ratio, luminance, and a gray which correspond to a viewing angle for training, based on the view characteristic information for training TVC_1 of the base panel 120 and the characteristic information for training TVC_2 of the optical layer 140, and is provided via the optical layer 140.

In an embodiment, the electronic device 100 may generate the front image for training 1210 by applying, to the second artificial intelligence model 710 via the mapping model 1500, the intermediate front image for training 720_1, the view characteristic information for training TVC_3 of the front panel 130, and the characteristic information for training TVC_2 of the optical layer 140.

In an embodiment, the electronic device 100 may generate the reference front image 1250 by applying, to the second simulation model 1240, the intermediate front image for training 720_1, the view characteristic information for training TVC_3 of the front panel 130, and the characteristic information for training TVC_2 of the optical layer 140.

In an embodiment, the electronic device 100 may calculate the third loss function LS_3 by applying the front image for training 1210 and the reference front image 1250 to the second discrimination model 1230, and may train the second discrimination model 1230 and the second artificial intelligence model 710, based on the third loss function LS_3. In an embodiment, the second artificial intelligence model 710 may be trained to infer the front image for training 1210 that is capable of compensating for the difference between the view characteristic information for training TVC_1 of the base panel 120 and the reference base characteristic information and the difference between the view characteristic information for training TVC_3 of the front panel 130 and the reference front characteristic information of the intermediate front image for training 720_1, and is combined with the intermediate front image for training 720_1 so as to provide an image corresponding to the viewing angle for training.

Referring to FIGS. 3, 6, 7, and 15, in an embodiment, the electronic device 100 may display, on the base panel 120, the base image 620 generated via the base image generation model 600, and may display, on the front panel 130, the front image 630 generated via the front image generation model 610 including the trained first artificial intelligence model 700 and the trained second artificial intelligence model 710, thereby providing the image 160 to the user 150. The image 160 provided to the user 150 via the electronic device 100 of the present disclosure may include another face of an object according to a view corresponding to a change in a viewing angle of the user 150 who views the electronic device 100, and may include gamma, a color, a contrast ratio, luminance, and a gray which are constant, regardless of a change in base characteristic information of the base panel 120 and front characteristic information of the front panel 130 due to the change in the viewing angle of the user 150.

To resolve the technical problem addressed above, in an embodiment, an electronic device for displaying an image includes a base panel, an optical layer provided on, directly or indirectly, the base panel, and a front panel provided on, directly or indirectly, the optical layer. The electronic device may include a user tracking sensor configured to obtain a viewing angle of a user viewing the image. The electronic device may include a memory storing at least one instruction, and at least one processor configured to execute the at least one instruction stored in the memory. The at least one processor may be configured to obtain an input image including a plurality of view images respectively corresponding to a plurality of different viewing angles. The at least one processor may be configured to generate a base image by decomposing the input image by using a base image generation model. The at least one processor may be configured to generate a front image corresponding to a viewing angle of the user by decomposing the input image by using a front image generation model, based on view characteristic information of the base panel which corresponds to the viewing angle of the user, view characteristic information of the front panel which corresponds to the viewing angle of the user, and characteristic information of the optical layer. The at least one processor may be configured to provide the image to the user by displaying the base image on the base panel and displaying the front image on the front panel.

In an embodiment, the viewing angle of the user may correspond to any one of the plurality of different viewing angles. The base panel may include a plurality of pieces of base characteristic information respectively corresponding to the plurality of different viewing angles and including at least one piece of information of gamma, a color, a contrast ratio, luminance, or a gray of an image displayed on the base panel. The view characteristic information of the base panel may be base characteristic information corresponding to the viewing angle of the user from among the plurality of pieces of base characteristic information. The front panel may include a plurality of pieces of front characteristic information respectively corresponding to the plurality of different viewing angles and including at least one piece of information of gamma, a color, a contrast ratio, luminance, or a gray of an image displayed on the front panel. The view characteristic information of the front panel may be front characteristic information corresponding to the viewing angle of the user among the plurality of pieces of front characteristic information.

In an embodiment, the characteristic information of the optical layer may include at least one piece of information among a refractive index of the optical layer, a focal length, a shape of the optical layer, or a size of the optical layer.

In an embodiment, the front image generation model may include a first front image generation model and a second front image generation model. The at least one processor may be configured to generate an intermediate front image, based on the view characteristic information of the base panel, by applying the input image, the view characteristic information of the base panel, and the characteristic information of the optical layer to the first front image generation model. The at least one processor may be configured to generate the front image by applying the intermediate front image and the view characteristic information of the front panel to the second front image generation model.

In an embodiment, the at least one processor may be configured to generate the front image by applying the intermediate front image, the view characteristic information of the front panel, and the characteristic information of the optical layer to the second front image generation model.

In an embodiment, the intermediate front image may be an image corresponding to an intermediate image that is the base image provided via the optical layer to the user having the obtained viewing angle of the user, the base image being displayed on the base panel.

In an embodiment, base characteristic information that is among the plurality of pieces of different base characteristic information and corresponds to a reference viewing angle may be reference base characteristic information, wherein the reference viewing angle is a viewing angle of a user who views the image at a front of the electronic device. In an embodiment, front characteristic information that is among the plurality of pieces of different front characteristic information and corresponds to the reference viewing angle may be reference front characteristic information. In an embodiment, the front image may be an image generated based on a difference between the view characteristic information of the base panel corresponding to the obtained viewing angle of the user and the reference base characteristic information and a difference between the view characteristic information of the front panel corresponding to the obtained viewing angle of the user and the reference front characteristic information.

In an embodiment, the first front image generation model may include a first artificial intelligence model trained to infer the intermediate front image, based on the input image, the view characteristic information of the base panel, and the characteristic information of the optical layer. The first artificial intelligence model may be an artificial intelligence model configured to generate an intermediate front image for training by applying, to the first artificial intelligence model, an input image for training, view characteristic information for training of the base panel corresponding to a viewing angle for training, and characteristic information for training of the optical layer. The first artificial intelligence model may be an artificial intelligence model configured to generate a reference intermediate front image based on the view characteristic information for training of the base panel, by applying, to a first simulation model, the input image for training, the view characteristic information for training of the base panel, and the characteristic information for training of the optical layer. The first artificial intelligence model may be an artificial intelligence model trained to infer, based on a first loss function according to a difference between the intermediate front image for training and the reference intermediate front image, the intermediate front image for training based on the view characteristic information for training of the base panel.

In an embodiment, the second front image generation model may include a second artificial intelligence model trained to infer the front image, based on the intermediate front image and the view characteristic information of the front panel. The second artificial intelligence model may be an artificial intelligence model configured to generate a front image for training by applying, to the second artificial intelligence model, the intermediate front image for training and view characteristic information for training of the front panel corresponding to the viewing angle for training. The second artificial intelligence model may be an artificial intelligence model configured to generate a reference front image based on a difference between the view characteristic information for training of the base panel and the reference base characteristic information and a difference between the view characteristic information for training of the front panel and the reference front characteristic information, by applying, to a second simulation model, the intermediate front image for training and the view characteristic information for training of the front panel. The second artificial intelligence model may be an artificial intelligence model trained to infer, based on a second loss function according to a difference between the front image for training and the reference front image, the front image for training based on the difference between the view characteristic information for training of the base panel and the reference base characteristic information and the difference between the view characteristic information for training of the front panel and the reference front characteristic information.

In an embodiment, the second artificial intelligence model may be an artificial intelligence model configured to generate the front image for training by applying, to the second artificial intelligence model, the intermediate front image for training, the view characteristic information for training of the front panel, and the characteristic information for training of the optical layer. The second artificial intelligence model may be an artificial intelligence model configured to generate a reference front image based on the difference between the view characteristic information for training of the base panel and the reference base characteristic information and the difference between the view characteristic information for training of the front panel and the reference front characteristic information, by applying, to the second simulation model, the intermediate front image for training, the view characteristic information for training of the front panel, and the characteristic information for training of the optical layer. The second artificial intelligence model may be an artificial intelligence model trained to infer, based on a third loss function according to a difference between the front image for training and the reference front image, the front image for training based on the difference between the view characteristic information for training of the base panel and the reference base characteristic information and the difference between the view characteristic information for training of the front panel and the reference front characteristic information.

To resolve the technical problem addressed above, in an embodiment, an operating method of an electronic device including a base panel, an optical layer provided on the base panel, and a front panel provided on the optical layer, and displaying an image may be provided. The operating method of the electronic device may include obtaining an input image including a plurality of view images respectively corresponding to a plurality of different viewing angles. The operating method of the electronic device may include obtaining a viewing angle of a user viewing the image. The operating method of the electronic device may include generating a base image by decomposing the input image by using a base image generation model. The operating method of the electronic device may include generating a front image corresponding to a viewing angle of the user by decomposing the input image by using a front image generation model, based on view characteristic information of the base panel which corresponds to the viewing angle of the user, view characteristic information of the front panel which corresponds to the viewing angle of the user, and characteristic information of the optical layer. The operating method of the electronic device may include providing the image to the user by displaying the base image on the base panel and displaying the front image on the front panel.

In an embodiment, the viewing angle of the user may correspond to any one of the plurality of different viewing angles. The base panel may include a plurality of pieces of base characteristic information respectively corresponding to the plurality of different viewing angles and including at least one piece of information of gamma, a color, a contrast ratio, luminance, or a gray of an image displayed on the base panel. The view characteristic information of the base panel may be base characteristic information corresponding to the viewing angle of the user from among the plurality of pieces of base characteristic information. The front panel may include a plurality of pieces of front characteristic information respectively corresponding to the plurality of different viewing angles and including at least one piece of information of gamma, a color, a contrast ratio, luminance, or a gray of an image displayed on the front panel. The view characteristic information of the front panel may be front characteristic information corresponding to the viewing angle of the user among the plurality of pieces of front characteristic information. The characteristic information of the optical layer may include at least one piece of information among a refractive index of the optical layer, a focal length, a shape of the optical layer, or a size of the optical layer.

In an embodiment, the front image generation model may include a first front image generation model and a second front image generation model. The generating of the front image corresponding to the viewing angle of the user may include generating an intermediate front image, based on the view characteristic information of the base panel, by applying the input image, the view characteristic information of the base panel, and the characteristic information of the optical layer to the first front image generation model. The generating of the front image corresponding to the viewing angle of the user may include generating the front image by applying the intermediate front image and the view characteristic information of the front panel to the second front image generation model.

In an embodiment, in the generating of the front image, the front image may be generated by applying the intermediate front image, the view characteristic information of the front panel, and the characteristic information of the optical layer to the second front image generation model.

In an embodiment, the intermediate front image may be an image corresponding to an intermediate image that is the base image provided via the optical layer to the user having the obtained viewing angle of the user, the base image being displayed on the base panel.

In an embodiment, base characteristic information that is among the plurality of pieces of different base characteristic information and corresponds to a reference viewing angle may be reference base characteristic information, wherein the reference viewing angle is a viewing angle of a user who views the image at a front of the electronic device. Front characteristic information that is among the plurality of pieces of different front characteristic information and corresponds to the reference viewing angle may be reference front characteristic information. The front image may be an image generated based on a difference between the view characteristic information of the base panel corresponding to the obtained viewing angle of the user and the reference base characteristic information and a difference between the view characteristic information of the front panel corresponding to the obtained viewing angle of the user and the reference front characteristic information.

In an embodiment, the first front image generation model may include a first artificial intelligence model trained to infer the intermediate front image, based on the input image, the view characteristic information of the base panel, and the characteristic information of the optical layer. The training of the first artificial intelligence model may include generating an intermediate front image for training by applying, to the first artificial intelligence model, an input image for training, view characteristic information for training of the base panel corresponding to a viewing angle for training, and characteristic information for training of the optical layer. The training of the first artificial intelligence model may include generating a reference intermediate front image based on the view characteristic information for training of the base panel, by applying, to a first simulation model, the input image for training, the view characteristic information for training of the base panel, and the characteristic information for training of the optical layer. The training of the first artificial intelligence model may include inferring the intermediate front image for training based on the view characteristic information for training of the base panel, based on a first loss function according to a difference between the intermediate front image for training and the reference intermediate front image.

In an embodiment, the second front image generation model may include a second artificial intelligence model trained to infer the front image, based on the intermediate front image and the view characteristic information of the front panel. The training of the second artificial intelligence model may include generating a front image for training by applying, to the second artificial intelligence model, the intermediate front image for training and view characteristic information for training of the front panel corresponding to the viewing angle for training, The training of the second artificial intelligence model may include generating a reference front image based on a difference between the view characteristic information for training of the base panel and the reference base characteristic information and a difference between the view characteristic information for training of the front panel and the reference front characteristic information, by applying, to a second simulation model, the intermediate front image for training and the view characteristic information for training of the front panel. The training of the second artificial intelligence model may include inferring the front image for training based on the difference between the view characteristic information for training of the base panel and the reference base characteristic information and the difference between the view characteristic information for training of the front panel and the reference front characteristic information, based on a second loss function according to a difference between the front image for training and the reference front image. "Based on" as used herein covers based at least on.

In an embodiment, in the generating of the front image for training, the front image for training may be generated by applying, to the second artificial intelligence model, the intermediate front image for training, the view characteristic information for training of the front panel, and the characteristic information for training of the optical layer. In the generating of the reference front image, the reference front image may be generated by applying, to the second simulation model, the intermediate front image for training, the view characteristic information for training of the front panel, and the characteristic information for training of the optical layer.

As an example embodiment, a computer-readable recording medium having recorded thereon a program for performing, on a computer, at least one method among the methods of the disclosed embodiments may be provided.

A program executable by the electronic device described in the present disclosure may be implemented as a hardware element, a software element, and/or a combination of hardware elements and software elements. The program is executable by any system capable of executing computer-readable instructions.

The software may include a computer program, code, instructions, or a combination of one or more thereof, and may configure the processor to operate as desired or may independently or collectively instruct the processor.

The software may be implemented as a computer program that includes instructions stored in computer-readable storage media. The computer-readable storage media may include, for example, magnetic storage media (e.g., a read-only memory (ROM), a random-access memory (RAM), floppy disks, hard disks, etc.) and optical storage media (e.g., a compact disc ROM (CD-ROM), a digital versatile disc (DVD), etc.). The computer-readable recording medium may be distributed in computer systems connected via a network and may store and execute computer-readable code in a distributed manner. The recording medium is readable by a computer, stored in a memory, and executable by a processor.

The computer-readable storage medium may be provided in the form of a non-transitory storage medium. Here, the term "non-transitory storage medium" may mean that the storage medium is a tangible device and does not include signals (e.g., electromagnetic waves), and may mean that data may be permanently or temporarily stored in the storage medium. For example, the "non-transitory storage medium" may include a buffer in which data is temporarily stored.

In addition, a program according to embodiments disclosed in the present specification may be provided in a computer program product. The computer program product may be traded as commodities between sellers and buyers.

The computer program product may include a software program and a computer-readable recording medium storing the software program. For example, the computer program product may include a product (e.g., a downloadable application) in the form of a software program electronically distributed via a manufacturer of the electronic device or an electronic market (e.g., Samsung Galaxy Store). For electronic distribution, at least part of the software program may be stored in a storage medium or temporarily generated. In this case, the storage medium may be a storage medium of a server of the manufacturer of the electronic device, a server of the electronic market, or a relay server for temporarily storing the S/W program.

Although the embodiments have been described with the limited embodiments and the drawings, various modifications and changes may be made by one of skill in the art from the above description. For example, suitable results may be obtained even when the described techniques are performed in a different order, or when components in a described electronic device, architecture, device, or circuit are coupled or combined in a different manner, or replaced or supplemented by other components or their equivalents. While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. An electronic device for displaying an image, the electronic device comprising:
a base panel;
an optical layer provided on the base panel;
a front panel provided on the optical layer;
a user tracking sensor configured to obtain a viewing angle of a user viewing the image;
a memory storing at least one instruction; and
at least one processor, comprising processing circuitry, configured to execute the at least one instruction stored in the memory,
wherein the at least one processor is, individually and/or collectively, configured to:
obtain an input image comprising a plurality of view images respectively corresponding to a plurality of different viewing angles,
generate a base image at least by decomposing the input image using at least a base image generation model,
generate a front image corresponding to a viewing angle of the user at least by decomposing the input image using at least a front image generation model, based on view characteristic information of the base panel which corresponds to the viewing angle of the user, view characteristic information of the front panel which corresponds to the viewing angle of the user, and characteristic information of the optical layer, and
provide the image to the user by displaying the base image via the base panel and displaying the front image via the front panel.

2. The electronic device of claim 1, wherein the viewing angle of the user corresponds to any one of the plurality of different viewing angles,
the base panel comprises a plurality of pieces of base characteristic information respectively corresponding to the plurality of different viewing angles and comprising at least one piece of information of gamma, a color, a contrast ratio, luminance, and/or a gray of an image displayed on the base panel,
the view characteristic information of the base panel comprises base characteristic information corresponding to the viewing angle of the user from among the plurality of pieces of base characteristic information,
the front panel comprises a plurality of pieces of front characteristic information respectively corresponding to the plurality of different viewing angles and comprising at least one piece of information of gamma, a color, a contrast ratio, luminance, and/or a gray of an image displayed on the front panel, and
the view characteristic information of the front panel comprises front characteristic information corresponding to the viewing angle of the user among the plurality of pieces of front characteristic information.

3. The electronic device of claim 1, wherein the characteristic information of the optical layer comprises at least one piece of information among a refractive index of the optical layer, a focal length, a shape of the optical layer, and/or a size of the optical layer.

4. The electronic device of claim 2, wherein the front image generation model comprises
a first front image generation model and a second front image generation model, and
the at least one processor is configured to
generate an intermediate front image, based on the view characteristic information of the base panel, at least by applying the input image, the view characteristic information of the base panel, and the characteristic information of the optical layer to the first front image generation model, and
generate the front image at least by applying the intermediate front image and the view characteristic information of the front panel to the second front image generation model.

5. The electronic device of claim 4, wherein the at least one processor is configured to
generate the front image at least by applying the intermediate front image, the view characteristic information of the front panel, and the characteristic information of the optical layer to the second front image generation model.

6. The electronic device of claim 4, wherein the intermediate front image comprises an image corresponding to an intermediate image that is the base image provided via the optical layer to the user having the obtained viewing angle of the user, the base image to be displayed on the base panel.

7. The electronic device of claim 4, wherein, when base characteristic information that is among the plurality of pieces of different base characteristic information and corresponds to a reference viewing angle is reference base characteristic information, wherein the reference viewing angle is a viewing angle of a user who views the image at a front of the electronic device, and front characteristic information that is among the plurality of pieces of different front characteristic information and corresponds to the reference viewing angle is reference front characteristic information, the front image is an image generated based on a difference between the view characteristic information of the base panel corresponding to the obtained viewing angle of the user and the reference base characteristic information and a difference between the view characteristic information of the front panel corresponding to the obtained viewing angle of the user and the reference front characteristic information.

8. The electronic device of any claim 4, wherein the first front image generation model comprises a first artificial intelligence model trained to infer the intermediate front image, based on the input image, the view characteristic information of the base panel, and the characteristic information of the optical layer, and the first artificial intelligence model comprises an artificial intelligence model trained to generate an intermediate front image for training by applying, to the first artificial intelligence model, an input image for training, view characteristic information for training of the base panel corresponding to a viewing angle for training, and characteristic information for training of the optical layer, generate a reference intermediate front image based on the view characteristic information for training of the base panel, by applying, to a first simulation model, the input image for training, the view characteristic information for training of the base panel, and the characteristic information for training of the optical layer, and infer, based on a first loss function according to a difference between the intermediate front image for training and the reference intermediate front image, the intermediate front image for training based on the view characteristic information for training of the base panel.

9. The electronic device of claim 8, wherein the second front image generation model comprises a second artificial intelligence model trained to infer the front image, based on the intermediate front image and the view characteristic information of the front panel, and the second artificial intelligence model comprises an artificial intelligence model trained to generate a front image for training by applying, to the second artificial intelligence model, the intermediate front image for training and view characteristic information for training of the front panel corresponding to the viewing angle for training, generate a reference front image based on a difference between the view characteristic information for training of the base panel and the reference base characteristic information and a difference between the view characteristic information for training of the front panel and the reference front characteristic information, by applying, to a second simulation model, the intermediate front image for training and the view characteristic information for training of the front panel, and infer, based on a second loss function according to a difference between the front image for training and the reference front image, the front image for training based on the difference between the view characteristic information for training of the base panel and the reference base characteristic information and the difference between the view characteristic information for training of the front panel and the reference front characteristic information.

10. The electronic device of claim 9, wherein the second artificial intelligence model comprises an artificial intelligence model trained to generate the front image for training by applying, to the second artificial intelligence model, the intermediate front image for training, the view characteristic information for training of the front panel, and the characteristic information for training of the optical layer, generate a reference front image based on the difference between the view characteristic information for training of the base panel and the reference base characteristic information and the difference between the view characteristic information for training of the front panel and the reference front characteristic information, by applying, to the second simulation model, the intermediate front image for training, the view characteristic information for training of the front panel, and the characteristic information for training of the optical layer, and infer, based on a third loss function according to a difference between the front image for training and the reference front image, the front image for training based on the difference between the view characteristic information for training of the base panel and the reference base characteristic information and the difference between the view characteristic information for training of the front panel and the reference front characteristic information.

11. An operating method of an electronic device comprising a base panel, an optical layer provided on the base panel, and a front panel provided on the optical layer, and displaying an image, the operating method comprising:

obtaining an input image comprising a plurality of view images respectively corresponding to a plurality of different viewing angles;

obtaining a viewing angle of a user viewing the image;

generating a base image at least by decomposing the input image using at least a base image generation model;

generating a front image corresponding to a viewing angle of the user at least by decomposing the input image using at least a front image generation model, based on view characteristic information of the base panel which corresponds to the viewing angle of the user, view characteristic information of the front panel which corresponds to the viewing angle of the user, and characteristic information of the optical layer; and providing the image to the user by displaying the base image on the base panel and displaying the front image on the front panel.

12. The operating method of claim 11, wherein the viewing angle of the user corresponds to any one of the plurality of different viewing angles, the base panel comprises a plurality of pieces of base characteristic information respectively corresponding to the plurality of different viewing angles and comprising at least one piece of information of gamma, a color, a contrast ratio, luminance, and/or a gray of an image displayed on the base panel, the view characteristic information of the base panel comprises base characteristic information corresponding to the viewing angle of the user from among the plurality of pieces of base characteristic information, the front panel comprises a plurality of pieces of front characteristic information respectively corresponding to the plurality of different viewing angles and comprising at least one piece of information of gamma, a color, a contrast ratio, luminance, and/or a gray of an image displayed on the front panel, the view characteristic information of the front panel comprises front characteristic information corresponding to the viewing angle of the user among the plurality of pieces of front characteristic information, and the characteristic information of the optical layer comprises at least one piece of information among a refractive index of the optical layer, a focal length, a shape of the optical layer, and/or a size of the optical layer.

13. The operating method of claim 11, wherein the front image generation model comprises a first front image generation model and a second front image generation model, and the generating of the front image corresponding to the viewing angle of the user comprises:

generating an intermediate front image, based on the view characteristic information of the base panel, by applying the input image, the view characteristic information of the base panel, and the characteristic information of the optical layer to the first front image generation model; and generating the front image by applying the intermediate front image and the view characteristic information of the front panel to the second front image generation model.

14. The operating method of claim 13, wherein, in the generating of the front image, the front image is generated by applying the intermediate front image, the view characteristic information of the front panel, and the characteristic information of the optical layer to the second front image generation model.

15. The operating method of claim 14, wherein the intermediate front image comprises an image corresponding to an intermediate image that is the base image provided via the optical layer to the user having the obtained viewing angle of the user, the base image to be displayed on the base panel.

16. The operating method of claim 13, wherein base characteristic information that is among the plurality of pieces of different base characteristic information and corresponds to a reference viewing angle is reference base characteristic information, wherein the reference viewing angle is a viewing angle of a user who views the image at a front of the electronic device, wherein front characteristic information that is among the plurality of pieces of different front characteristic information and corresponds to the reference viewing angle is reference front characteristic information, wherein the front image is an image generated based on a difference between the view characteristic information of the base panel corresponding to the obtained viewing angle of the user and the reference base characteristic information and a difference between the view characteristic information of the front panel corresponding to the obtained viewing angle of the user and the reference front characteristic information.

17. The operating method of claim 13, wherein the first front image generation model comprises a first artificial intelligence model trained to infer the intermediate front image, based on the input image, the view characteristic information of the base panel, and the characteristic information of the optical layer, wherein the training of the first artificial intelligence model comprises:

generating an intermediate front image for training by applying, to the first artificial intelligence model, an input image for training, view characteristic information for training of the base panel corresponding to a viewing angle for training, and characteristic information for training of the optical layer;

generating a reference intermediate front image based on the view characteristic information for training of the base panel, by applying, to a first simulation model, the input image for training, the view characteristic information for training of the base panel, and the characteristic information for training of the optical layer; and inferring the intermediate front image for training based on the view characteristic information for training of the base panel, based on a first loss function according to a difference between the intermediate front image for training and the reference intermediate front image.

18. The operating method of claim 17, wherein the second front image generation model comprises a second artificial intelligence model trained to infer the front image, based on the intermediate front image and the view characteristic information of the front panel, wherein the training of the second artificial intelligence model comprises:

generating a front image for training by applying, to the second artificial intelligence model, the intermediate front image for training and view characteristic information for training of the front panel corresponding to the viewing angle for training;

generating a reference front image based on a difference between the view characteristic information for training of the base panel and the reference base characteristic information and a difference between the view characteristic information for training of the front panel and the reference front characteristic information, by applying, to a second simulation model, the intermediate front image for training and the view characteristic information for training of the front panel; and inferring the front image for training based on the difference between the view characteristic information for training of the base panel and the reference base characteristic information and the difference between the view characteristic information for training of the front panel and the reference front characteristic information, based on a second loss function according to a difference between the front image for training and the reference front image.

19. The operating method of claim 18, wherein, in the generating of the front image for training, generating the front image for training by applying, to the second artificial intelligence model, the intermediate front image for training, the view characteristic information for training of the front panel, and the characteristic information for training of the optical layer, wherein, in the generating of the reference front image, generating the reference front image by applying, to the second simulation model, the intermediate front image for training, the view characteristic information for training of the front panel, and the characteristic information for training of the optical layer.

20. A non-transitory computer-readable recording medium having recorded thereon a program for performing, on a computer, the method of claim 11.

* * * * *